(12) United States Patent
Hara

(10) Patent No.: US 8,537,267 B2
(45) Date of Patent: Sep. 17, 2013

(54) IMAGE PROCESSING APPARATUS, IMAGE PROCESSING METHOD AND PROGRAM

(75) Inventor: Akihiro Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/280,844

(22) Filed: Oct. 25, 2011

(65) Prior Publication Data
US 2012/0154637 A1 Jun. 21, 2012

(30) Foreign Application Priority Data
Dec. 20, 2010 (JP) .................................. 2010-282524

(51) Int. Cl.
*H04N 5/232* (2006.01)
(52) U.S. Cl.
USPC ........................................ 348/349; 348/345
(58) Field of Classification Search
USPC .................................. 348/345, 346, 347, 349
See application file for complete search history.

(56) References Cited

U.S. PATENT DOCUMENTS

| 8,098,321 B2 * | 1/2012 | Shimoda et al. | 348/349 |
| 2010/0238343 A1 * | 9/2010 | Kawarada | 348/345 |
| 2012/0057057 A1 * | 3/2012 | Amano | 348/294 |

FOREIGN PATENT DOCUMENTS

JP 2009-145401 7/2009

* cited by examiner

*Primary Examiner* — Sinh Tran
*Assistant Examiner* — Zhenzhen Wu
(74) *Attorney, Agent, or Firm* — Sony Corporation

(57) ABSTRACT

An image processing apparatus includes an estimation unit configured to estimate an image generation pixel value corresponding to a position of a phase difference detection pixel of an image element, based on a determination pixel value of image data including the determination pixel value and the image generation pixel value as image data generated by the imaging device including the phase difference detection pixel for generating the determination pixel value for making a focus determination and an image generation pixel for generating the image generation pixel value for generating an image, and an interpolation unit configured to interpolate image generation pixel values of pixels configuring the image data based on the estimated image generation pixel value and the image generation pixel value generated by the image generation pixel.

20 Claims, 23 Drawing Sheets

FIG. 6A  FIG. 6B  FIG. 6C  FIG. 6D
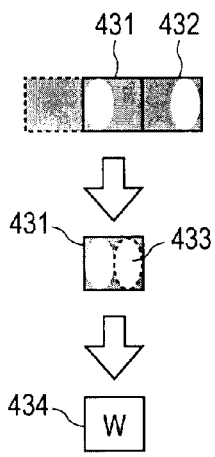
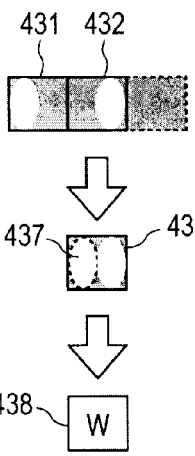
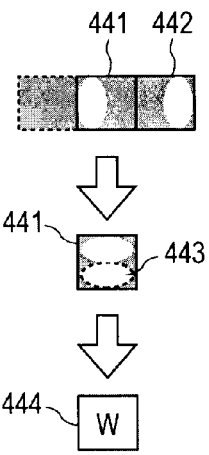
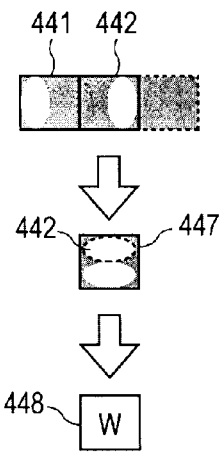
FIG. 6E
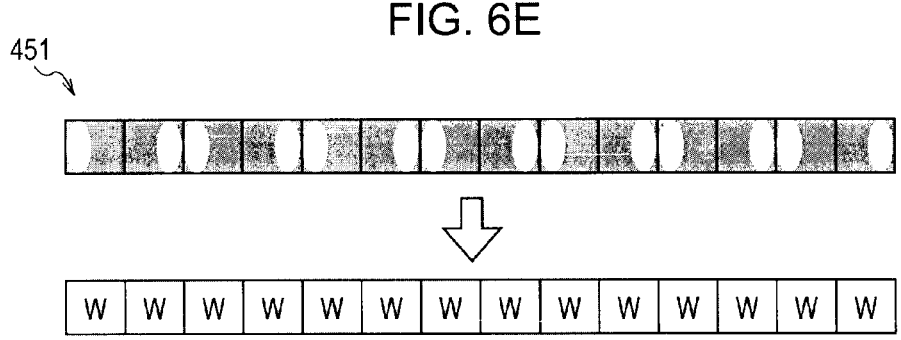
FIG. 6F
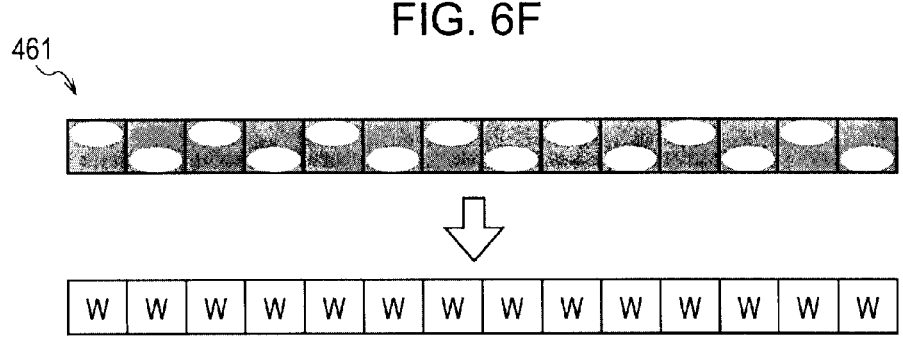

FIG. 7A
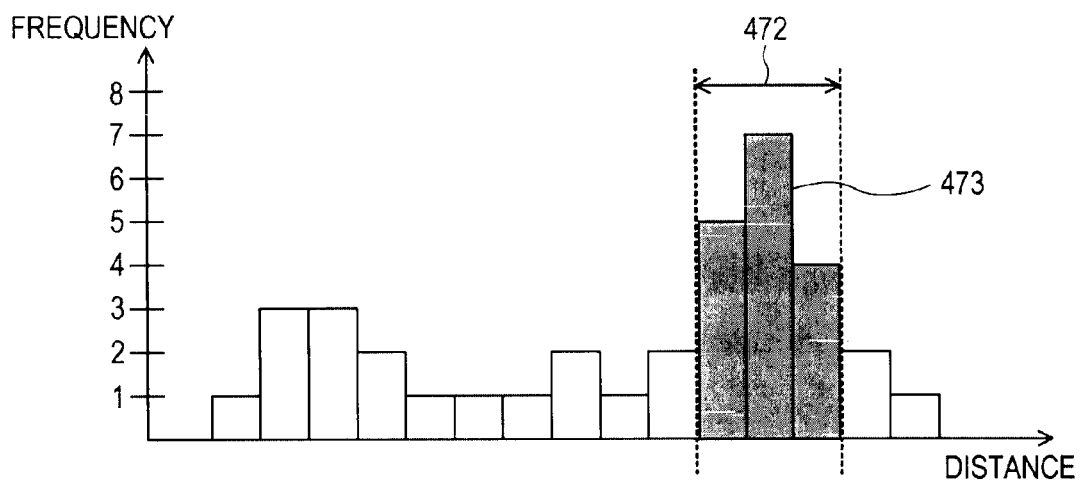
FIG. 7B
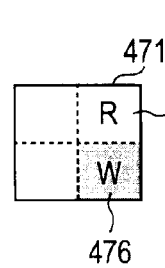
FIG. 7C

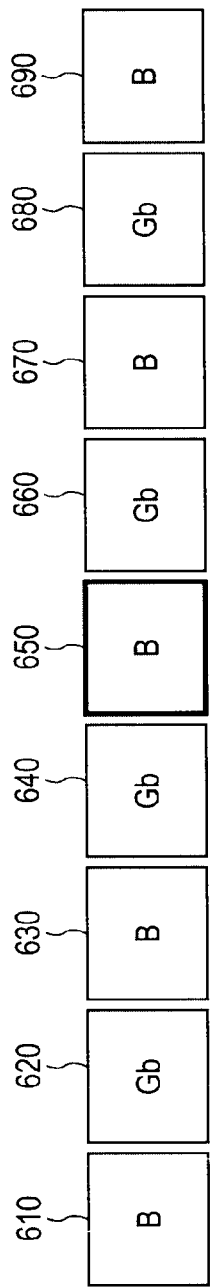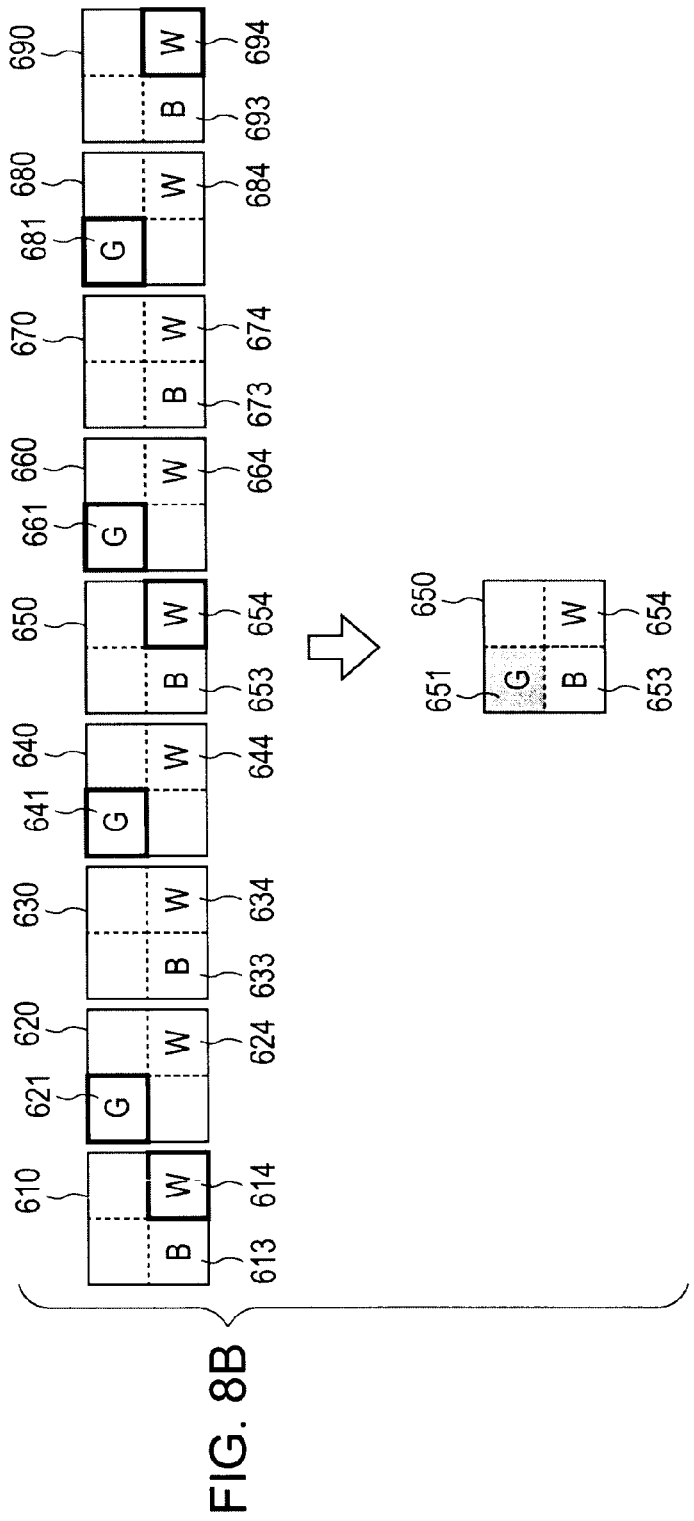
FIG. 8A
FIG. 8B

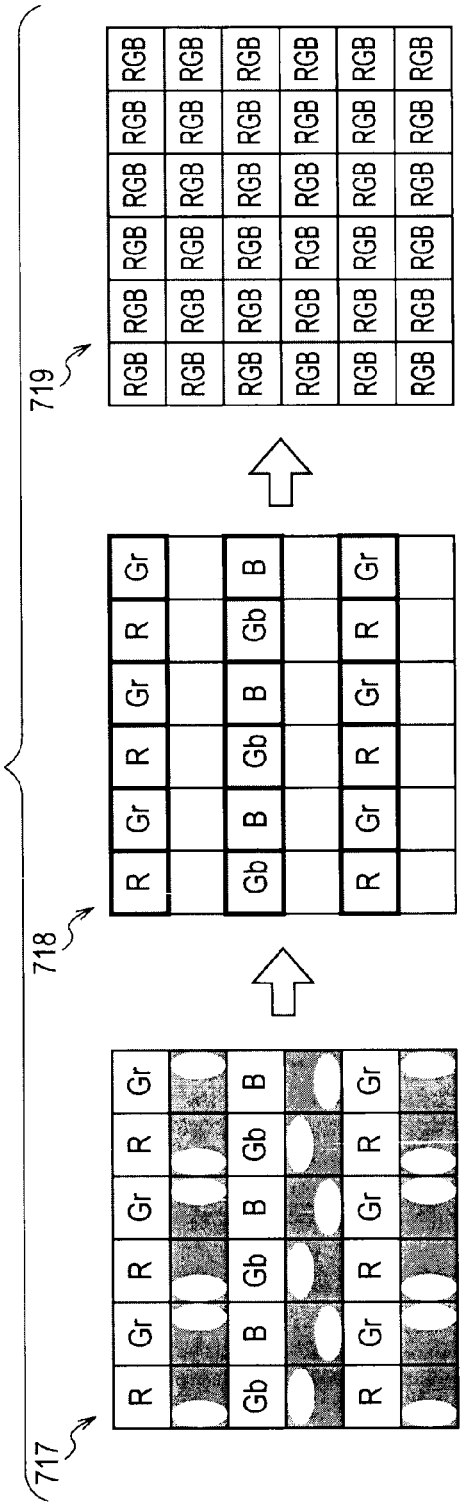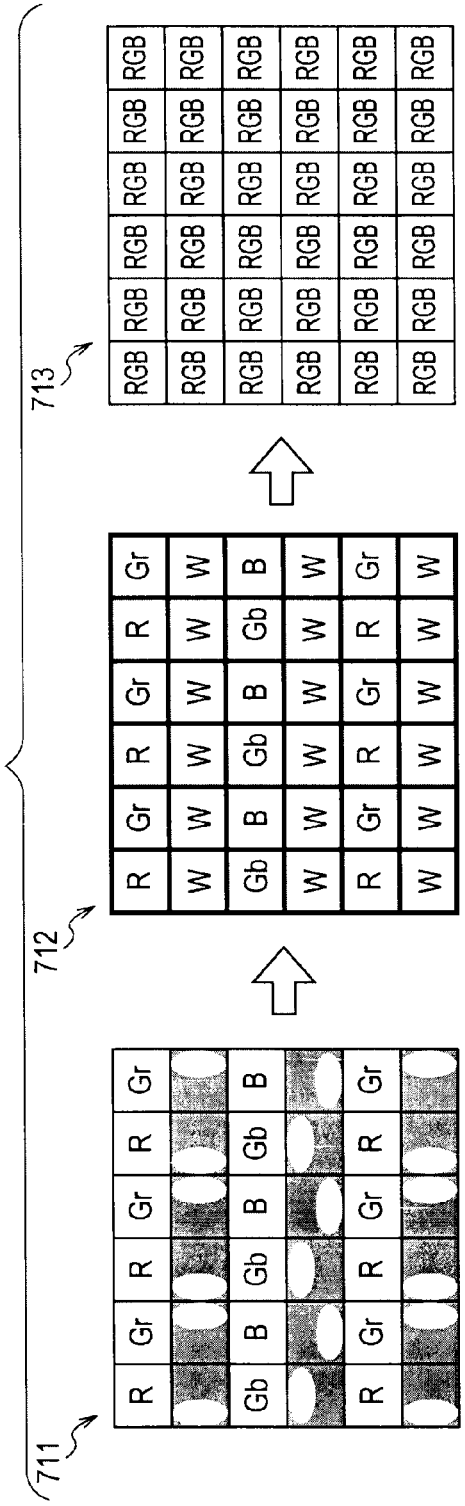

FIG. 19A
FIG. 19B
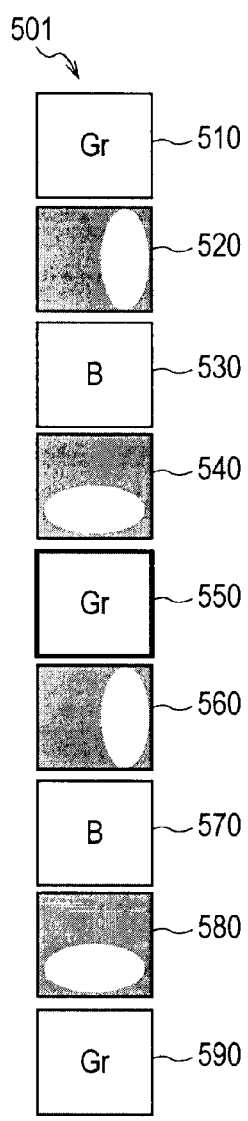
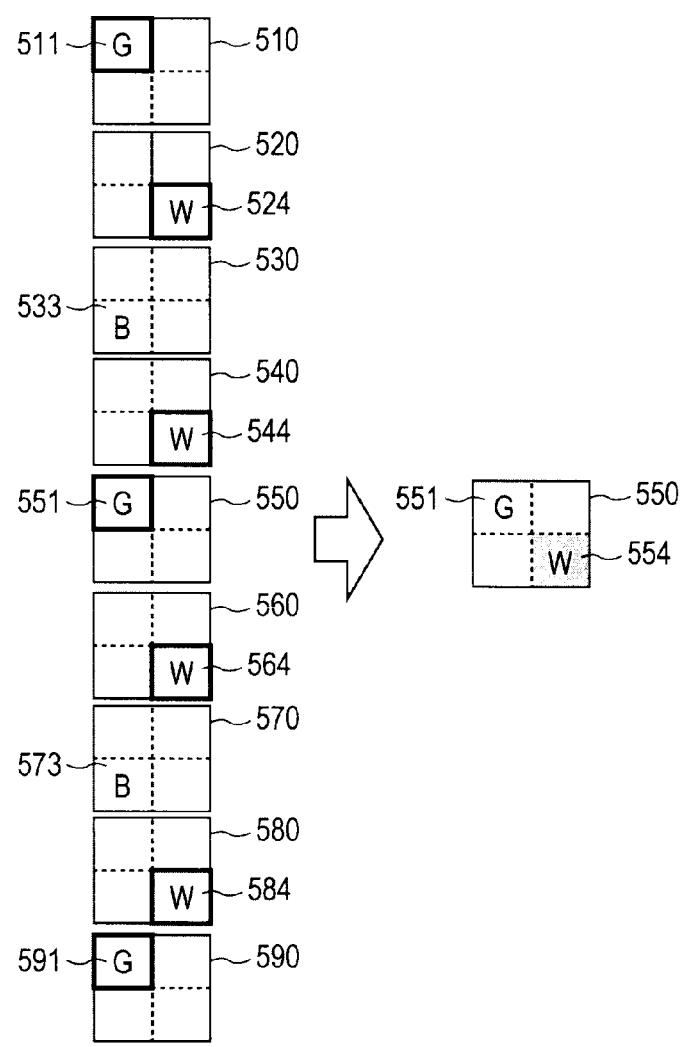

IMAGE PROCESSING APPARATUS, IMAGE PROCESSING METHOD AND PROGRAM

BACKGROUND

The present disclosure relates to an image processing apparatus and, more particularly, to an image processing apparatus and image processing method for interpolating color information and a program causing a computer to execute the method.

Recently, an imaging apparatus such as a digital camera for imaging an object such as a person using an imaging device so as to generate an imaged image and recording the generated imaged image has been in widespread use. An imaging device in which color filters are arranged in the pixels arranged in a light receiving surface in a Bayer array has been in widespread use as the imaging device.

Recently, consequent upon multi-functioning and high resolution of imaging apparatuses, an imaging device has been considered in which pixels other than pixels for generating an image are arranged in the pixels arranged in the imaging device or an imaging device in which pixels utilizing color filters other than the color filters (R, G, B) used for a Bayer array are arranged. For example, an imaging device has been considered in which the existing pixels (image generation pixels) for generating an image and new pixels for multi-function are arranged in the same imaging device.

For example, an imaging apparatus including such an imaging device, for example, an imaging apparatus in which pixels (phase difference detection pixels) for pupil dividing light passing through an imaging lens has been proposed (for example, Japanese Unexamined Patent Application Publication No. 2009-145401). This imaging apparatus shields half subject light received by a light receiving element and providing phase difference detection pixels for performing pupil division so as to form a pair of images and measures a gap between the formed images so as to calculate a focus deviation. This imaging apparatus calculates a movement quantity of an imaging lens based on the calculated focus deviation and adjusts the position of the imaging lens based on the calculated movement quantity, thereby performing focus control.

SUMMARY

In the above-described related art, since both the phase difference detection pixel and the image generation pixel are included in one imaging device, it may not be necessary to separately provide two imaging devices including an imaging device for focus detection and an imaging device for an imaged image to the imaging apparatus.

In the above-described related art, if an interpolation process is performed with respect to image data generated by the imaging device, color information of the phase difference detection pixel and the image generation pixels is interpolated (demosaicing process) using the pixel value of the image generation pixel. Accordingly, in comparison with the case where an interpolation process is performed with respect to image data generated by an imaging device which does not include phase difference detection pixels and includes only image generation pixels, the ratio of pixel values used for the interpolation process is decreased. In the case where an interpolation process is performed with respect to image data generated by an imaging device including phase difference detection pixels and image generation pixels, it is important to prevent the image quality of the image data from deteriorating due to the decrease in the ratio of the pixel values used for the interpolation process.

The present disclosure has been made in view of such circumstances, it is desirable to improve the image quality of the image data.

According to an embodiment of the present disclosure, there are provided an image processing apparatus including an estimation unit configured to estimate an image generation pixel value corresponding to a position of a phase difference detection pixel of an image element, based on a determination pixel value of image data including the determination pixel value and the image generation pixel value as image data generated by the imaging device including the phase difference detection pixel for generating the determination pixel value for making a focus determination and an image generation pixel for generating the image generation pixel value for generating an image, and an interpolation unit configured to interpolate image generation pixel values of pixels configuring the image data based on the estimated image generation pixel value and the image generation pixel value generated by the image generation pixel, an image processing method, and a program for causing a computer to execute the method. Accordingly, it is possible to perform the interpolation process of the image generation pixel values using the determination pixel value generated by the phase difference detection pixel.

The image processing apparatus may further include a distance information generation unit configured to generate distance information based on a defocus quantity calculated based on the determination pixel value for each phase difference detection pixel, and the interpolation unit may interpolate the image generation pixel values of pixels configuring the image data based on the estimated image generation pixel value, the distance information and the image generation pixel value generated by the image generation pixel. Accordingly, it is possible to perform the interpolation process of the image generation pixel values using the distance information generated by the distance information generation unit. In this case, the interpolation unit may set a color to be an interpolation of a reference pixel as a target color using a pixel to be interpolated as the reference pixel, calculate distance information of the image generation pixel based on distance information of the phase difference detection pixel if the image generation pixel value of the reference pixel is interpolated using the distance information, set a pixel which holds an image generation pixel value related to the target color among pixels located in a predetermined range from the reference pixel as a target pixel, detect the target pixel within the predetermined range from the reference pixel in a distance specified by the distance information of the target pixel based on the distance information, and interpolate the image generation pixel values by setting an average value of the image generation pixel values related to the target color of the detected target pixel to the image generation pixel value related to the target color of the pixel to be interpolated. Accordingly, it is possible to detect the target pixel close to the reference pixel in the distance specified by the distance information of the target pixel based on the distance information and interpolate the image generation pixel values by setting the average value of the image generation pixel values related to the target color of the detected target pixel to the image generation pixel value related to the target color of the pixel to be interpolated. In this case, the interpolation unit may create a frequency distribution of pixels for the distance specified by the distance information of the target pixel, set a distance, in which a frequency of the frequency distribution belongs to a maximum class, as a reference, detect the target pixel corresponding to the distance within the predetermined range from the reference, and set the average value of the image generation pixel value related to the target color of the detected target pixel as the image generation pixel value related to the target color of the pixel to be interpolated. Accordingly, it is possible to detect the target pixel by the frequency distribution (histogram).

The phase difference detection pixel may include a microlens for focusing subject light, a light receiving element for generating an image generation pixel value by receiving the subject light and a light shielding unit disposed between the microlens and the light receiving element for partially shielding the subject light, and the estimation unit may calculate the pixel value related to light shielded by the light shielding unit of the phase difference detection pixel to be estimated based on the determination pixel value generated by the phase difference detection pixel to be estimated and the determination pixel value generated by the phase difference detection pixel adjacent to the phase difference detection pixel to be estimated, and estimate the image generation pixel value of the position of the phase difference detection pixel based on the calculated pixel value and the determination pixel value of the phase difference detection pixel to be estimated. Accordingly, it is possible to calculate the pixel value related to light shielded by the phase difference detection pixel light shielding unit and estimate the image generation pixel value of the position of the phase difference detection pixel based on the calculated pixel value and the determination pixel value of the phase difference detection pixel to be estimated. In this case, the image generation pixel may include a red pixel covered by a red filter for shielding light other than a wavelength region indicating red, a blue pixel covered by a blue filter for shielding light other than a wavelength region indicating blue, and a green pixel covered by a green filter for shielding light other than a wavelength region indicating green, the phase difference detection pixel may be covered by a white filter or a transparent layer transmitting light of a visible light region, and the estimation unit may estimate the image generation pixel value related to white as the image generation pixel value of the position of the phase difference detection pixel. Accordingly, it is possible to estimate the image generation pixel value related to the white as the image generation pixel value of the position of the phase difference detection pixel.

The interpolation unit may set a color to be an interpolation of a reference pixel to a target color using a pixel to be interpolated as the reference pixel, interpolate the image generation pixel value related to white of the image generation pixel values of pixels configuring the image data, and then interpolate the image generation pixel values related to the target color of the reference pixel, based on the image generation pixel value related to the target color of the pixels located within a predetermined range from the reference pixel, the image generation pixel value related to white of the pixels covered by the same filter as the pixel to be interpolated as the pixels located within the predetermined range from the reference pixel and the image generation pixel value related to the white of the reference pixel. Accordingly, it is possible to interpolate the image generation pixel values related to the target color of the reference pixel, based on the image generation pixel value related to the target color of the pixels located within the predetermined range from the reference pixel, the image generation pixel value related to white of the pixels covered by the same filter as the pixel to be interpolated as the pixels located within the predetermined range from the reference pixel and the image generation pixel value related to the white of the reference pixel.

The interpolation unit may interpolate the image generation pixel values related to the target color of the reference pixel, based on a low frequency component of the image generation pixel value related to the white calculated based on the image generation pixel value related to the white of the pixels located within the predetermined range from the reference pixel, a low frequency component of the image generation pixel value related to the target color calculated based on the image generation pixel value related to the target color of the pixels covered by the filter of the target color located within the predetermined range from the reference pixel, and the image generation pixel value related to the white of the reference pixel. Accordingly, it is possible to interpolate the image generation pixel values related to the target color of the reference pixel, based on the low frequency component of the image generation pixel value related to the target color and the image generation pixel value related to the white of the reference pixel.

In the imaging device, a first line configured by arranging the image generation pixels in a specific direction and a second line configured by arranging the phase difference detection pixels in the specific direction may be alternately arranged in an orthogonal direction orthogonal to the specific direction, and the interpolation unit may interpolate the image generation pixel values related to the white of the green pixel, based on a low frequency component of the image generation pixel value related to the white calculated from the image generation pixel value related to the white of the phase difference detection pixels located within the predetermined range in the orthogonal direction of the reference pixel and a low frequency component of the image generation pixel value related to the white calculated from the image generation pixel value related to green of the green pixels located within the predetermined range, and the image generation pixel value related to green of the reference pixel. Accordingly, it is possible to interpolate the image generation pixel values of the image data generated by the imaging device in which the first line configured by arranging the image generation pixels in the specific direction and the second line configured by arranging the phase difference detection pixels in the specific direction are alternately arranged in an orthogonal direction orthogonal to the specific direction.

According to another embodiment of the present disclosure, there is provided an image processing apparatus including a distance information generation unit configured to generate distance information based on a defocus quantity calculated for each phase difference detection pixel based on a determination pixel value of image data including the determination pixel value and an image generation pixel value as image data generated by an imaging device including a phase difference detection pixel for generating the determination pixel value for making a focus determination and an image generation pixel for generating the image generation pixel value for generating an image; and an interpolation unit configured to interpolate the image generation pixel value of a pixel to be interpolated among pixels configuring the image data based on the generated distance information and the image generation pixel value generated by the image generation pixel. Accordingly, it is possible to perform the interpolation process of the image generation pixel values using the distance information generated by the distance information generation unit.

According to the embodiments of the present disclosure, it is possible to obtain excellent effects such as the improvement of the image quality of image data.

BRIEF DESCRIPTION OF THE DRAWINGS

FIGS. 6A to 6F are schematic diagrams showing an example of the calculation of a phase difference pixel W value by a phase difference detection pixel W value calculation unit according to the first embodiment of the present disclosure.

FIGS. 7A to 7C are schematic diagrams showing an example of the calculation of a W value of an R pixel and a B pixel by the R-and-B pixel W calculation unit according to the first embodiment of the present disclosure.

FIGS. 8A and 8B are schematic diagrams showing an example of the calculation of a W value of an R pixel and a B pixel by the R-and-B pixel G calculation unit according to the first embodiment of the present disclosure.

FIGS. 9A and 9B are schematic diagrams showing an example of a demosaicing process using a W value by the demosaicing unit of the imaging apparatus according to the first embodiment of the present disclosure and an example of a demosaicing process of an imaging apparatus of the related art.

FIGS. 19A and 19B are schematic diagrams showing an example of the calculation of a W value of a G pixel by a G pixel W value calculation unit according to the second embodiment of the present disclosure.

DETAILED DESCRIPTION OF EMBODIMENTS

Hereinafter, modes (hereinafter, referred to as embodiments) of the present disclosure will be described. A description will be given in the following order.

1. First Embodiment (Imaging Control: Example of Demosaicing Process using Luminance Value of Phase Difference Detection Pixel)

2. Second embodiment (Imaging Control: Example of Calculating W Value of G Pixel from Correlation between G Value and W Value)

3. Modified Example

1. First Embodiment

Internal Configuration Example of Imaging System

Figure 1:
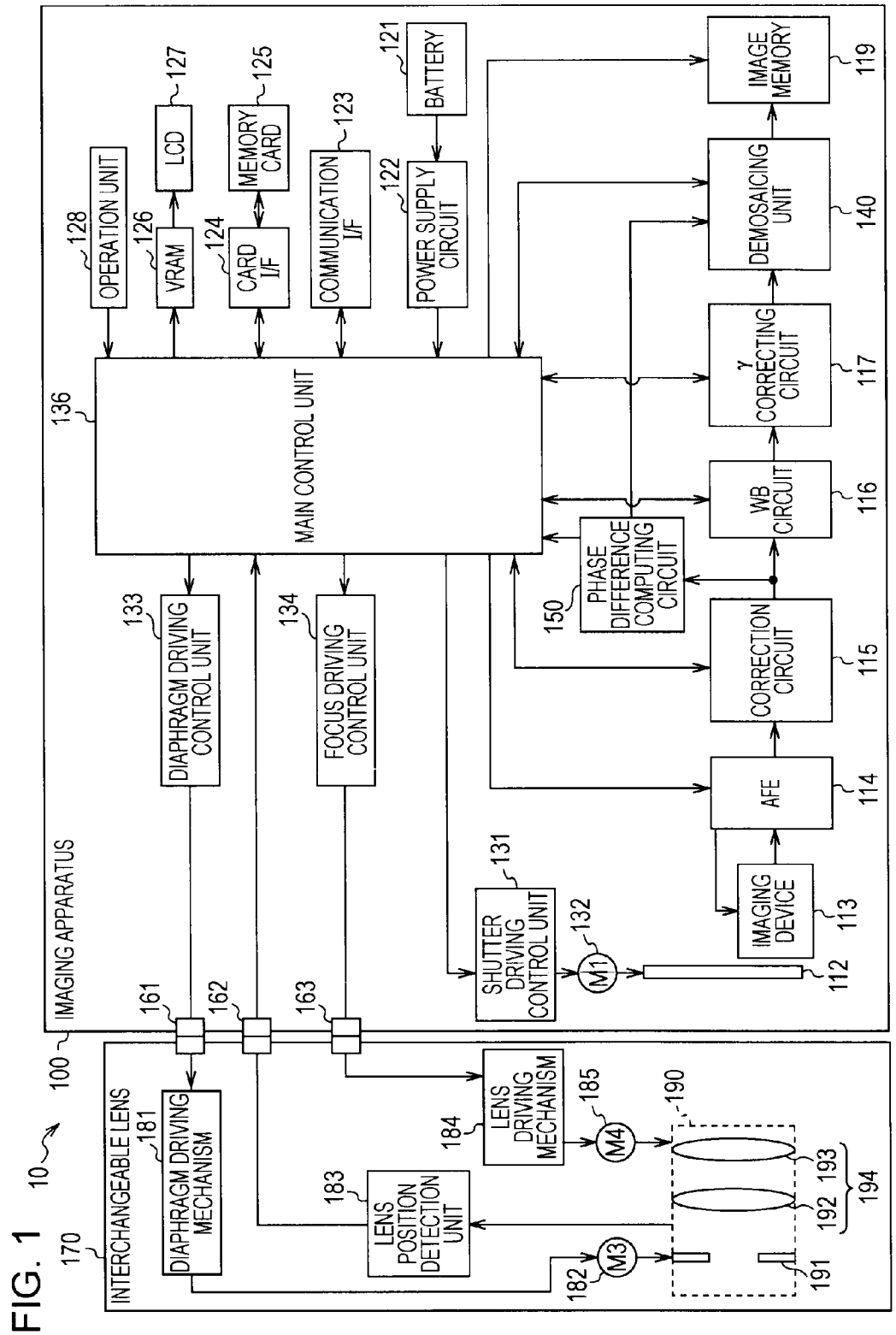
FIG. 1 is a schematic diagram showing an example of an internal configuration of an imaging system according to a first embodiment of the present disclosure.

FIG. 1 is a schematic diagram showing an example of an internal configuration of an imaging system 10 according to a first embodiment of the present disclosure. This imaging system 10 includes an imaging apparatus 100 and an interchangeable lens 170.

In addition, in the first embodiment of the present disclosure, the imaging system 10 is a single lens reflex camera for imaging an image, in which a lens is interchangeable. In FIG. 1, for convenience of description, an internal configuration (for example, a configuration of a flash) which is little used when an image is imaged will be omitted.

In FIG. 1, for convenience of description, only a configuration related to the driving of a focus lens is shown with respect to the driving of a lens and a configuration related to the driving of a zoom lens will be omitted.

The imaging apparatus 100 images an object, generates image data (digital data), and records the generated image data as image content (still image content or moving image content). Hereinafter, an example of recording still image content (still image file) as image content (image file) is mainly described. This imaging apparatus 100 includes a shutter unit 112, an imaging device 113, an analog front end (AFE) 114, a correction circuit 115, a phase difference computing circuit 150, a white balance (WB) circuit 116, and a γ correction circuit 117. The imaging apparatus 100 includes a demosaicing unit 140, an image memory 119, a battery 121, a power supply circuit 122, a communication interface (I/F) 123, a card I/F 124 and a memory card 125. In addition, the imaging apparatus 100 includes a video random access memory (VRAM) 126, a liquid crystal display (LCD) 127, an operation unit 128, a shutter driving control unit 131 and a shutter driving motor (M1) 132. The imaging apparatus 100 includes a diaphragm driving control unit 133, a focus driving control unit 134, a main control unit 136, and connection terminals 161 to 163.

The shutter unit 112 opens and closes an optical path of incident light from a subject incident to the imaging device 113 by a curtain body which moves in all directions and is driven by the shutter driving motor (M1) 132. The shutter unit 112 supplies the incident light from the subject to the imaging device 113 if the optical path is opened.

The imaging device 113 photoelectrically converts the incident light from the subject into an electrical signal, receives the incident light from the subject, and generates an analog electrical signal. The imaging device 113 is realized by, for example, a Complementary Metal Oxide Semiconductor (CMOS) sensor and a Charge Coupled Device (CCD) sensor. In the imaging device 113, a pixel (image generation pixel) for generating a signal for generating an imaged image based on the light received from the subject and phase difference detection pixel for generating a signal for performing phase difference detection.

In the imaging device 113, as the image generation pixel, a pixel (R pixel) for receiving red light by a color filter for transmitting red (R) light and a pixel (G pixel) for receiving green light by a color filter for transmitting green (G) light are arranged. In addition, in the imaging device 113, in addition to the R pixel and the G pixel, as the image generation pixel, a pixel (B pixel) for receiving blue light by a color filter for transmitting blue (B) light is arranged. The imaging device 113 will be described with reference to FIG. 4. The imaging device 113 supplies an electrical signal (analog image signal) generated by photoelectric conversion to the AFE 114.

The AFE 114 performs predetermined signal processing with respect to the analog image signal supplied from the imaging device 113 and performs, for example, signal processing such as noise elimination and signal amplification with respect to the analog image signal. The AFE 114 converts the image signal subjected to signal processing into a digital signal and generates the digital image signal. The AFE 114 generates a timing pulse for an imaging operation of the imaging device 113 based on a reference clock supplied from the main control unit 136 and supplies the generated timing pulse to the imaging device 113. The AFE 114 supplies the generated digital image signal (pixel value) to the correction circuit 115.

The correction circuit 115 performs predetermined signal processing with respect to the image signal supplied from the AFE 114 and corrects the image signal. The correction circuit 115 performs, for example, black level correction, defect correction, shading correction, mixed color correction, or the like. Here, black level correction is a process of adjusting a black level such that a pixel value becomes "0" if the quantity of received light is "0" by subtracting a pixel value generated in a pixel of a region which is typically shielded from each pixel value. Defect correction is a process of estimating and correcting a pixel value of a pixel (defective pixel) which does not normally perform a function in the imaging device 113 from a pixel value of a peripheral pixel of the defective pixel. Shading correction is a process of correcting deterioration (shading) in luminance which occurs as a pixel position is shifted from the center of the imaging device 113 to the peripheral part by applying gain according to an image height to pixel values of the overall image. Mixed color correction is a process of correcting increase (mixed color) of a pixel value by light leaked from an adjacent pixel by estimating increment of the mixed color and performing subtraction. The correction circuit 115 supplies the image signal generated by a phase difference detection pixel among the image signals subjected to such correction processing to the phase difference computing circuit 150. The correction circuit 115 supplies the image signal (the image signal generated by the phase difference detection pixel and the image generation pixel) to the WB circuit 116.

The WB circuit 116 performs a process (so-called white balance correction) of correcting color balance of the imaged image based on a predetermined reference color which is white. The WB circuit 116 supplies the image signal subjected to white balance correction to the γ correction circuit 117.

The γ correction circuit 117 corrects a gray scale property of the image data subjected to white balance correction. More specifically, the γ correction circuit 117 performs a non-linear conversion (so-called γ correction) with respect to the pixel value generated by each pixel using a predetermined gamma correction table. The γ correction circuit 117 supplies the image signal subjected to γ correction to the demosaicing unit 140.

The phase difference computing circuit 150 detects deviation of focus using a phase difference detection method based on the image signal generated by the phase difference detection pixel supplied from the correction circuit 115. The phase difference computing circuit 150 performs computation for deviation of focus of a focused object, for autofocus (AF), and supplies information about the detected focus to the main control unit 136. The phase difference computing unit 150 detects deviation of focus of a pair of phase difference detection pixels and supplies information about the detected focus to the demosaicing unit 140, for each pixel of phase difference detection pixels.

The demosaicing unit 140 performs a demosaicing process (interpolation process) such that all channels of R, G and B are aligned at each pixel position. The demosaicing unit 140 performs a demosaicing process based on the image signal generated by the phase difference detection pixel, the image signal generated by the image generation pixels (R pixel, G pixel and B pixel), and information about focus. The demosaicing unit 140 supplies the image signal subjected to the demosaicing process to the image memory 119.

The image memory 119 temporarily holds the image signal supplied from the demosaicing unit 140. The image memory 119 is used as a working region for performing predetermined processing with respect to the image according to a control signal from the main control unit 136. The image memory 119 temporarily holds the image signal read from the memory card 125.

The battery 121 supplies power for operating the imaging system 10 and includes, for example, a secondary battery such as a nickel-hydrogen rechargeable battery. The battery 121 supplies power to the power supply circuit 122.

The power supply circuit 122 converts power supplied from the battery 121 into a voltage for operating each unit of the imaging system 10. For example, the power supply circuit 122 generates a voltage of 5V and supplies the generated voltage to the main control unit 136, if the main control unit 136 operates at the voltage of 5V. The power supply circuit 122 supplies the generated voltage to each unit of the imaging system 10. In FIG. 1, the power supply line from the power supply circuit 122 to each unit is partially omitted.

The communication I/F 123 is an interface for enabling data transmission between an external device and the main control unit 136.

The card I/F 124 is an interface for enabling data transmission between the memory card 125 and the main control unit 136.

The memory card 125 is a storage medium for holding an image signal and holds data supplied through the card I/F 124.

The VRAM 126 is a buffer memory for temporarily holding an image displayed on the LCD 127 and supplies the held image to the LCD 127.

The LCD 127 displays an image under the control of the main control unit 136 and the LCD 127 includes, for example, a color liquid crystal panel. The LCD 127 displays an imaged image, a recorded image, a mode setting screen, or the like.

The operation unit 128 receives a user operation and supplies a press signal to the main control unit 136, for example, when a shutter button (not shown) is pressed. The operation unit 128 supplies a signal related to a user operation to the main control unit 136.

The shutter driving control unit 131 generates a driving signal for driving the shutter driving motor (M1) 132 based on a shutter control signal supplied from the main control unit 136 and supplies the generated driving signal to the shutter driving motor (M1) 132.

The shutter driving motor (M1) 132 is a motor for driving the shutter unit 112 based on the driving signal supplied from the shutter driving control unit 131.

The diaphragm driving control unit 133 generates a signal (diaphragm driving control signal) for controlling the driving of a diaphragm based on information about a diaphragm supplied from the main control unit 136 and supplies the generated diaphragm driving signal to the interchangeable lens 170 through the connection terminal 161.

The main control unit 136 controls the operation of each unit of the imaging apparatus 100 and includes, for example, a macro computer including a ROM for storing a control program.

The focus driving control unit 134 generates a driving quantity signal indicating the driving quantity of a lens based on information about focus supplied from the main control unit 136. The focus driving control unit 134 supplies the generated driving quantity signal to the interchangeable lens 170 through the connection terminal 163.

The interchangeable lens 170 includes a plurality of lenses, focuses light of an image imaged by the imaging apparatus 100 and forms an image on an imaging surface using the focused light. The interchangeable lens 170 includes a diaphragm driving mechanism 181, a diaphragm driving motor (M3) 182, a lens position detection unit 183, a lens driving mechanism 184, a lens driving motor (M4) 185 and a lens barrel 190. The lens barrel 190 includes a diaphragm 191 and a lens group 194. In the lens group 194, for convenience of description, only a zoom lens 192 and a focus lens 193 are shown.

The diaphragm driving mechanism 181 generates a driving signal for driving the diaphragm driving motor (M3) 182 based on a diaphragm driving control signal supplied through the connection terminal 161. The diaphragm driving mechanism 181 supplies the generated driving signal to the diaphragm driving motor (M3) 182.

The diaphragm driving motor (M3) 182 is a motor for driving the diaphragm 191 based on the driving signal supplied from the diaphragm driving mechanism 181. The diaphragm driving motor (M3) 182 changes the diaphragm diameter of the diaphragm 191 by driving the diaphragm 191.

The lens position detection unit 183 detects the position of the zoom lens 192 and the focus lens 193 of the lens group 194. The lens position detection unit 183 supplies information (lens position information) about the detected position to the imaging apparatus 100 through the connection terminal 162.

The lens driving mechanism 184 generates a driving signal for driving the lens driving motor (M4) 185 based on a driving quantity signal supplied through the connection terminal 163. The lens driving mechanism 184 supplies the generated driving signal to the lens driving motor (M4) 185.

The lens driving motor (M4) 185 is a motor for driving the focus lens 193 based on the driving signal supplied from the lens driving mechanism 184. The lens driving motor (M4) 185 adjusts focus by driving the focus lens 193.

The lens barrel 190 is a part in which lenses configuring the lens group 194 of the interchangeable lens 170 are mounted.

The diaphragm 191 is a shield material for adjusting the quality of incident light from the subject incident to the imaging apparatus 100.

The zoom lens 192 is moved in the lens barrel 190 in an optical axis direction to change a focal length and adjust the magnification of the subject included in the imaged image.

The focus lens 193 is moved in the lens barrel 190 in an optical axis direction to adjust focus.

Functional Configuration Example of Imaging System

Figure 2:
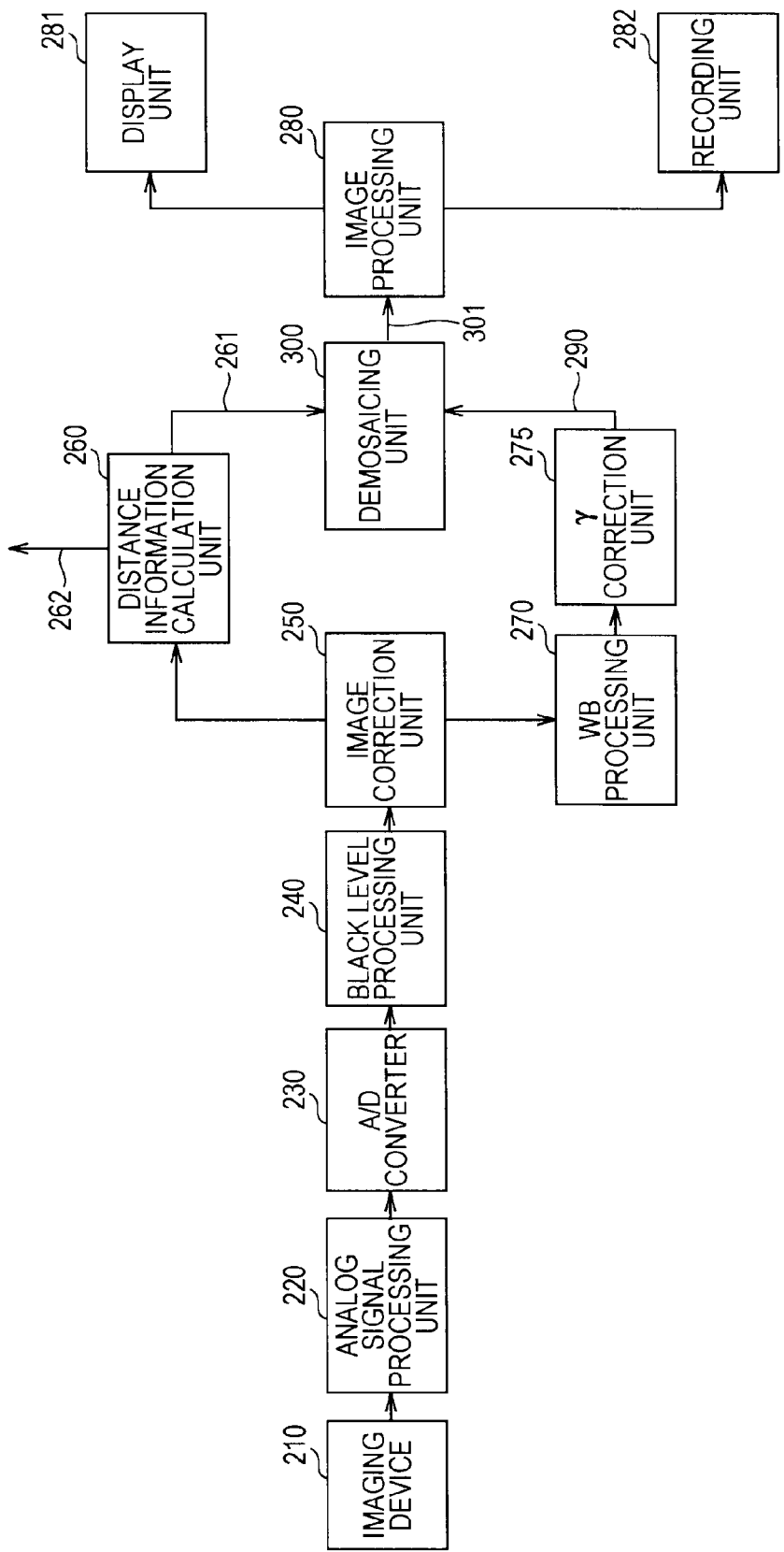
FIG. 2 is a block diagram showing an example of a functional configuration of an imaging apparatus of the imaging system according to the first embodiment of the present disclosure.

FIG. 2 is a block diagram showing an example of a functional configuration of the imaging apparatus 100 of the imaging system 10 according to the first embodiment of the present disclosure.

In the same figure, each related configuration until an image developed after the imaging device generates an image signal is generated will be described.

The imaging apparatus 100 includes an imaging device 210, an analog signal processing unit 220, an A/D converter 230, a black level processing unit 240, an image correction unit 250, and a distance information calculation unit 260. The imaging apparatus 100 includes a WB processing unit 270, a γ correction unit 275, a demosaicing unit 300, an image processing unit 280, a display unit 281, and a recording unit 282.

The imaging device 210 photoelectrically converts the incident light from the subject into an electrical signal so as to generate an image signal. The imaging device 210 supplies an analog image signal generated by the image generation pixel and the phase difference detection pixel arranged in the imaging device 210 to the analog signal processing unit 220. The imaging device 210 corresponds to the imaging device 113 shown in FIG. 1.

The analog signal processing unit 220 performs a predetermined analog signal process with respect to the analog image signal supplied from the imaging device 210. The analog signal processing unit 220 is realized by, for example, a correlated double sampling (CDS) circuit, an auto gain control (AGC) circuit, a clamp circuit and the like. That is, the analog signal processing unit 220 performs noise elimination, signal amplification or the like of the analog image signal. The analog signal processing unit 220 supplies the analog image signal subjected to signal processing to the A/D converter 230. The analog signal processing unit 220 corresponds to the AFE 114 shown in FIG. 1.

The A/D converter 230 converts the analog image signal supplied from the analog signal processing unit 220 into a digital image signal (pixel value). That is, the A/D converter 230 changes a signal of a continuous quantity of each pixel to a signal indicated a numerical value. The A/D converter 230 supplies the converted digital image signal to the black level processing unit 240. The A/D converter 230 corresponds to the AFE 114 shown in FIG. 1.

The black level processing unit 240 performs black level correction with respect to the pixel value supplied from the A/D converter 230. The black level processing unit 240 supplies the image signal subjected to black level correction to the image correction unit 250. The black level processing unit 240 corresponds to the correction circuit 115 shown in FIG. 1.

The image correction unit 250 performs detection such as defect correction, shading correction and mixed color correction with respect to the image signal supplied from the black level processing unit 240. The image correction unit 250 supplies the image signal generated by the phase difference detection pixel of the image signal subjected to correction to the distance information calculation unit 260. The image correction unit 250 supplies the image signal subjected to correction (the image signal of the signal of both pixels (the image generation pixel and the phase difference detection pixel) to the WB processing unit 270. The image correction unit 250 corresponds to the correction circuit 115 shown in FIG. 1.

The distance information calculation unit 260 calculates distance information which is information about deviation of focus of the place, in which the phase difference detection pixel is arranged, based on the image signal of the phase difference detection pixel supplied from the image correction unit 250. The distance information calculation unit 260 detects deviation of focus (defocus quantity) of the place where a pair of phase difference detection pixels is arranged, for each pair of the phase difference detection pixel. The distance information calculation unit 260 supplies information about the detected deviation of focus (e.g., a value indicating the quantity of deviation of a pair of images by the number of pixels) to the demosaicing unit 300 through the signal line 261 as distance information. The distance information calculation unit 260 detects deviation of focus for a focused object and supplies the detected deviation of focus to the main control unit 136 through the signal line 262. In addition, the distance information calculation unit 260 corresponds to a phase difference computing circuit 150 shown in FIG. 1. The distance information calculation unit 260 corresponds to a distance information generation unit described in claims.

The WB processing unit 270 performs white balance correction with respect to the image signal supplied from the image correction unit 250. The WB processing unit 270, for example, specifies a part estimated as originally white from the image signal of the image generation pixel (R pixel, G pixel and B pixel) so as to calculate correction gain and adjusts (corrects) level balance of the image signal of the phase difference detection pixel, the R pixel, the G pixel and the B pixel. The WB processing unit 270 supplies the image signal after correction to the γ correction unit 275. The WB processing unit 270 corresponds to the WB circuit 116 shown in FIG. 1.

The γ correction unit 275 performs γ correction with respect to the image signal supplied from the WB processing unit 270. The γ correction unit 275 performs γ correction with respect to the image signal of the phase difference detection pixel, the R pixel, the G pixel and the B pixel and supplies the image signal (image data) correction gamma correction to the demosaicing unit 300 through the signal line 290. The γ correction unit 275 corresponds to the γ correction circuit 117 shown in FIG. 1.

The demosaicing unit 300 performs a demosaicing process (interpolation process) such that all channels of R, G and B are aligned at each pixel position, based on the image signal (image data) supplied from the γ correction unit 275 and the distance information supplied from the distance information calculation unit 260. That is, through the demosaicing process through the demosaicing unit 300, all colors (R, G and B) of the positions of the pixels are aligned so as to develop the image. The demosaicing unit 300 supplies the image data (RGB image) subjected to the demosaicing process to the image processing unit 280 through the signal line 301. The demosaicing unit 300 will be described in detail with reference to FIG. 3.

The image processing unit 280 generates display image data viewed to a user and recorded image data recorded on a recording medium based on the RGB image supplied from the demosaicing unit 300. The image processing unit 280 reduces the RGB image according to the resolution of the display unit 281 so as to generate the display image data and supplies the generated display image data to the display unit 281. The image processing unit 280 compresses the RGB image according to a recording method recorded in the recording unit 282 so as to generate the recorded image and supplies the generated recorded image data to the recording unit 282. The image processing unit 280 corresponds to the main control unit 136 shown in FIG. 1.

The display unit 281 displays an image based on the display image data supplied from the image processing unit 280. The display unit 281 is realized by, for example, a color liquid crystal panel. The display unit 281 corresponds to the LCD 127 shown in FIG. 1.

The recording unit 282 records the recorded image data supplied from the image processing unit 280 as image content (image file). For example, as the recording unit 282, a removable recording medium (one or a plurality of recording mediums) such as a disc such as a digital versatile disc (DVD) or a semiconductor memory such as a memory card may be used. This recording medium may be mounted in the imaging apparatus 100 and may be detached from the imaging apparatus 100. The recording unit 282 corresponds to the memory card 125 shown in FIG. 1.

Functional Configuration Example of Demosaicing Unit

Figure 3:
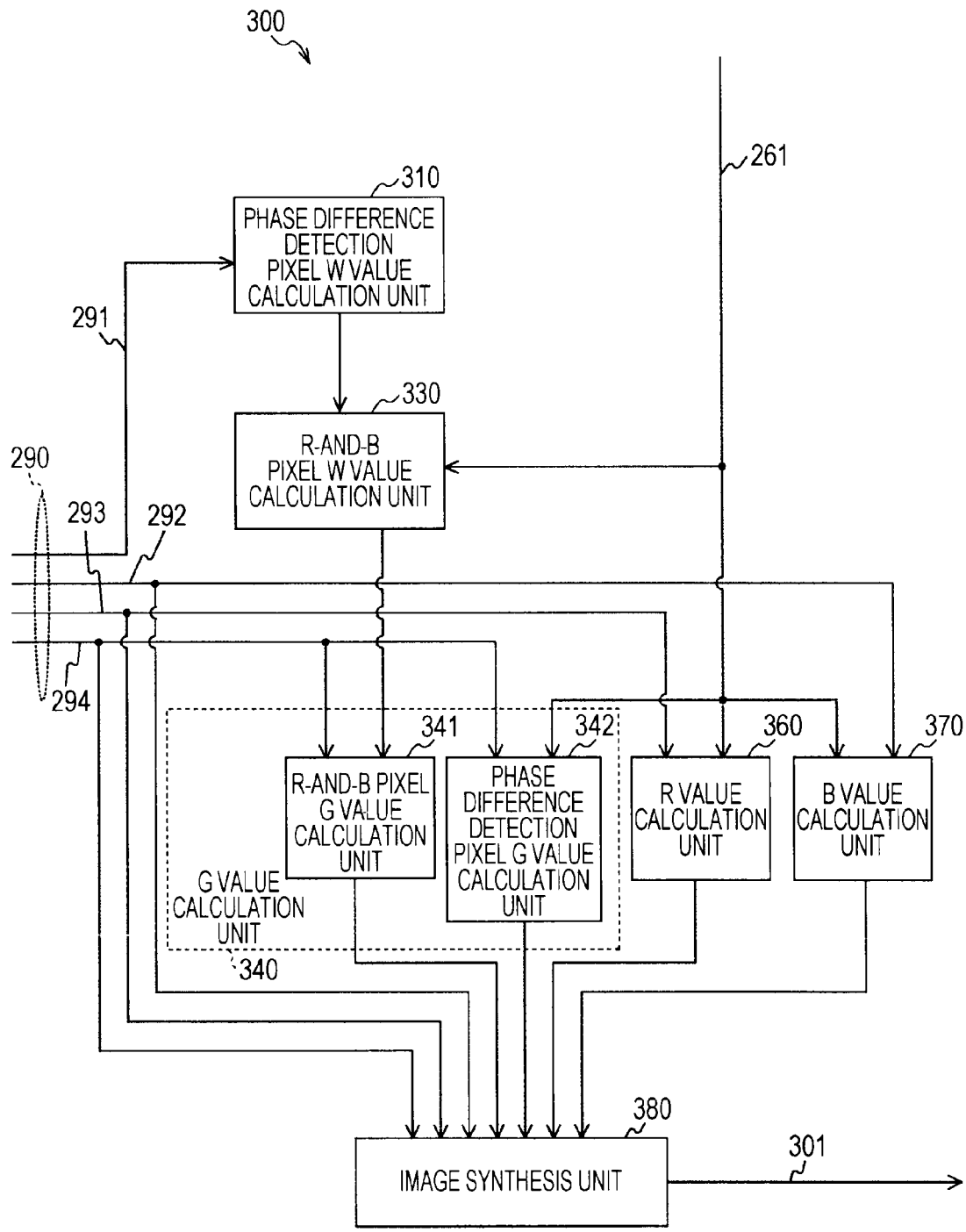
FIG. 3 is a block diagram showing an example of a functional configuration of a demosaicing unit according to the first embodiment of the present disclosure.

FIG. 3 is a block diagram showing an example of a functional configuration of the demosaicing unit 300 according to the first embodiment of the present disclosure.

The demosaicing unit 300 includes a phase difference detection pixel W value calculation unit 310, a B pixel W value calculation unit 330, a G value calculation unit 340, an R value calculation unit 360, a B value calculation unit 370 and an image synthesis unit 380.

The phase difference detection pixel W value calculation unit 310 calculates the pixel value (W value) of the white (W) color of each phase difference detection pixel based on the image signal (determined pixel value) of each phase difference detection pixel of the image data. The W value indicates the pixel value generated by the image generation pixel (referred to as a white (W) pixel) including a filter transmitting all light of a visible light wavelength region. The W pixel including such a filter is, for example, an image generation pixel which does not include a filter (includes a transparent layer instead of a filter layer), an image generation pixel including a filter (white filter) absorbing light of the other wavelength, or the like.

That is, the phase difference detection pixel W value calculation unit 310 estimates the pixel value (W value) of the assumed position in the case where it is assumed that the W pixel (the image generation pixel receiving all light of the visible light wavelength region) is arranged at the position of the phase difference detection pixel from the pixel value of the phase difference detection pixel. Then, the pixel value (image generation pixel value) generated by the image generation pixel in the case where it is assumed that the image generation pixel including a filter having the same color as the phase difference detection pixel is arranged at the position of each phase difference detection pixel is generated. The phase difference detection pixel W value calculation unit 310 supplies the calculated W value (hereinafter, referred to as a phase difference detection pixel W value) of the phase difference detection pixel to the R-and-B pixel W value calculation unit 330. The calculation of the phase difference detection pixel W value by the phase difference detection pixel W value calculation unit 310 will be described with reference to FIGS. 6A to 6F. The phase difference detection pixel W value calculation unit 310 is an example of an estimation unit described in the claims.

The R-and-B pixel W value calculation unit 330 calculates the W value of the R pixel and the B pixel of the image generation pixel based on the phase difference detection pixel W value supplied from the phase difference detection pixel W value calculation unit 310 and the distance information supplied from the distance information calculation unit 260 through the signal line 261. That is, the R-and-B pixel W value calculation unit 330 estimates the pixel value (W value) in the case where it is assumed that the W pixel is arranged at the positions of the R pixel and the B pixel from the phase difference detection pixel W value and the distance information. The R-and-B pixel W value calculation unit 330 detects a target pixel close to a reference pixel in a distance designated by the distance information in the phase difference detection pixels (target pixels) within a predetermined range centered on a pixel (reference pixel) to be calculated. The R-and-B pixel W value calculation unit 330 sets an average value of the W value (pixel value related to a target color) of the detected pixel to the W value of the reference pixel. If the target pixel close to the reference pixel is detected by a histogram (frequency distribution), the target pixel corresponding to the distance within the predetermined range (within a predetermined threshold) from a reference using the distance in which a frequency belongs to a maximum class as the reference. The R-and-B pixel W value calculation unit 330 supplies the calculated W value of the R pixel (R pixel W value) and W value of the B pixel (B pixel W value) to the R-and-B pixel G value calculation unit 341 of the G value calculation unit 340. The calculation of the R pixel W value and the B pixel W value by the R-and-B pixel W value calculation 330 will be described with reference to FIGS. 7A to 7C.

The G value calculation unit 340 calculates (interpolates) the pixel value (G value) related to the G color in the pixel other than the G pixel. Here, the G value is a value indicating a gray scale of G in color space expression by RGB and is a pixel value generated by the pixel (G pixel) which receives green light by a color filter transmitting green (G) light. That is, the G value calculation unit 340 estimates the G value of the assumed position in the case where it is assumed that the G pixel is arranged at the positions of the phase difference detection pixel, the R pixel and the B pixel. The G value calculation unit 340 includes an R-and-B pixel G value calculation unit 341 and a phase difference detection pixel G value calculation unit 342.

The R-and-B pixel G value calculation unit 341 calculates the G value of the R pixel and the G value of the B pixel based on the G value of the G pixel (G pixel G value) supplied through the G line 294 of the signal line 290 and the R pixel W value and the B pixel W value supplied from the R-and-B pixel W value calculation unit 330. The R-and-B pixel G value calculation unit 341 calculates the G value of the R pixel (R pixel G value) and the G value of the B pixel (B pixel G value) based on correlation between the W value and the G value and the W value of the pixel to be calculated. That is, in the R-and-B pixel G value calculation unit 341, the W value is used as a pixel value for generating the pixel value (image generation pixel value) configuring an image. The R-and-B pixel G value calculation unit 341 supplies the calculated R pixel G value and B pixel G value to the image synthesis unit 380. The calculation of the R pixel G value and the B pixel G value by the R-and-B pixel G value calculation unit 341 will be described with reference to FIGS. 8A and 8B.

The phase difference detection pixel G value calculation unit 342 calculates the G value of the phase difference detection pixel (phase difference detection pixel G value) based on the G value of the G pixel (G pixel G value) supplied through the G line 294 of the signal line 290 and the distance information supplied through the signal line 261. The phase difference detection pixel G value calculation unit 342 detects the G pixel of a distance position having a high frequency within a predetermined range centered on a pixel to be calculated from the histogram and sets the average value of the G value of the corresponding G pixel (G pixel G value) to the G value of the phase difference detection pixel to be calculated. That is, the phase difference detection pixel G value calculation unit 342 calculates the phase difference detection pixel G value by the calculation method using the histogram, similarly to the R-and-B pixel W value calculation unit 330. The phase difference detection pixel G value calculation unit 342 supplies the calculated phase difference detection pixel G value to the image synthesis unit 380.

The R value calculation unit 360 calculates (interpolates) the pixel value (R value) related to the R color in the pixel other than the R pixel. Here, the R value is a value indicating a gray scale of R in color space expression by RGB and is a pixel value generated by the pixel (R pixel) which receives red light by a color filter transmitting red (R) light. The R value calculation unit 360 estimates the R value of the phase difference detection pixel, the R value of the G pixel and the R value of the B pixel based on the R value of the R pixel (R pixel R value) supplied through the R line 293 of the signal line 290 and the distance information supplied through the signal line 261. The R value calculation unit 360 calculates the R value of each pixel by the calculation method using the histogram, similarly to the R-and-B pixel W value calculation unit 330. The R value calculation unit 360 supplies the calculated R values (phase difference detection pixel R value, the G pixel R value and the B pixel R value) to the image synthesis unit 380.

The B value calculation unit 370 calculates (interpolates) the pixel value (B value) related to the B color in the pixel other than the B pixel. Here, the B value is a value indicating a gray scale of B in color space expression by RGB and is a pixel value generated by the pixel (B pixel) which receives red light by a color filter transmitting blue (B) light. The B value calculation unit 370 estimates the B value of the phase difference detection pixel, the B value of the R pixel and the B value of the G pixel based on the B value of the B pixel (B pixel B value) supplied through the B line 292 of the signal line 290 and the distance information supplied through the signal line 261. The B value calculation unit 370 calculates the B value of each pixel by the calculation method using the histogram, similarly to the R-and-B pixel W value calculation unit 330. The B value calculation unit 370 supplies the calculated B values (phase difference detection pixel B value, the R pixel B value and the G pixel B value) to the image synthesis unit 380. The R-and-B pixel W value calculation unit 330, the R-and-B pixel G value calculation unit 341, the phase difference detection pixel G value calculation unit 342, the R value calculation unit 360 and the B value calculation unit 370 are an example of an interpolation unit of the claims.

The image synthesis unit 380 synthesizes a RGB image. The image synthesis unit 380 synthesizes image data of an R component of the RGB image based on the R pixel R value from the R line 293 and the R values (the phase difference detection pixel R value, the G pixel R value and the B pixel R value) from the R value calculation unit 360. The image synthesis unit 380 synthesizes image data of a G component of the RGB image based on the G pixel G value from the G line 294 and the G values (the R pixel G value, the B pixel G value and the phase difference detection pixel G value) from the R-and-B pixel G value calculation unit 341 and the phase difference detection pixel G value calculation unit 342. The image synthesis unit 380 synthesizes image data of a B component of the RGB image based on the B pixel B value from the B line 292 and the B values (the phase difference detection pixel B value, the R pixel B value, the G pixel B value) from the B value calculation unit 370. The image synthesis unit 380 supplies the image, in which RGB is aligned, through the signal line 301.

Arrangement Example of Pixels in Imaging Device

Figure 4:
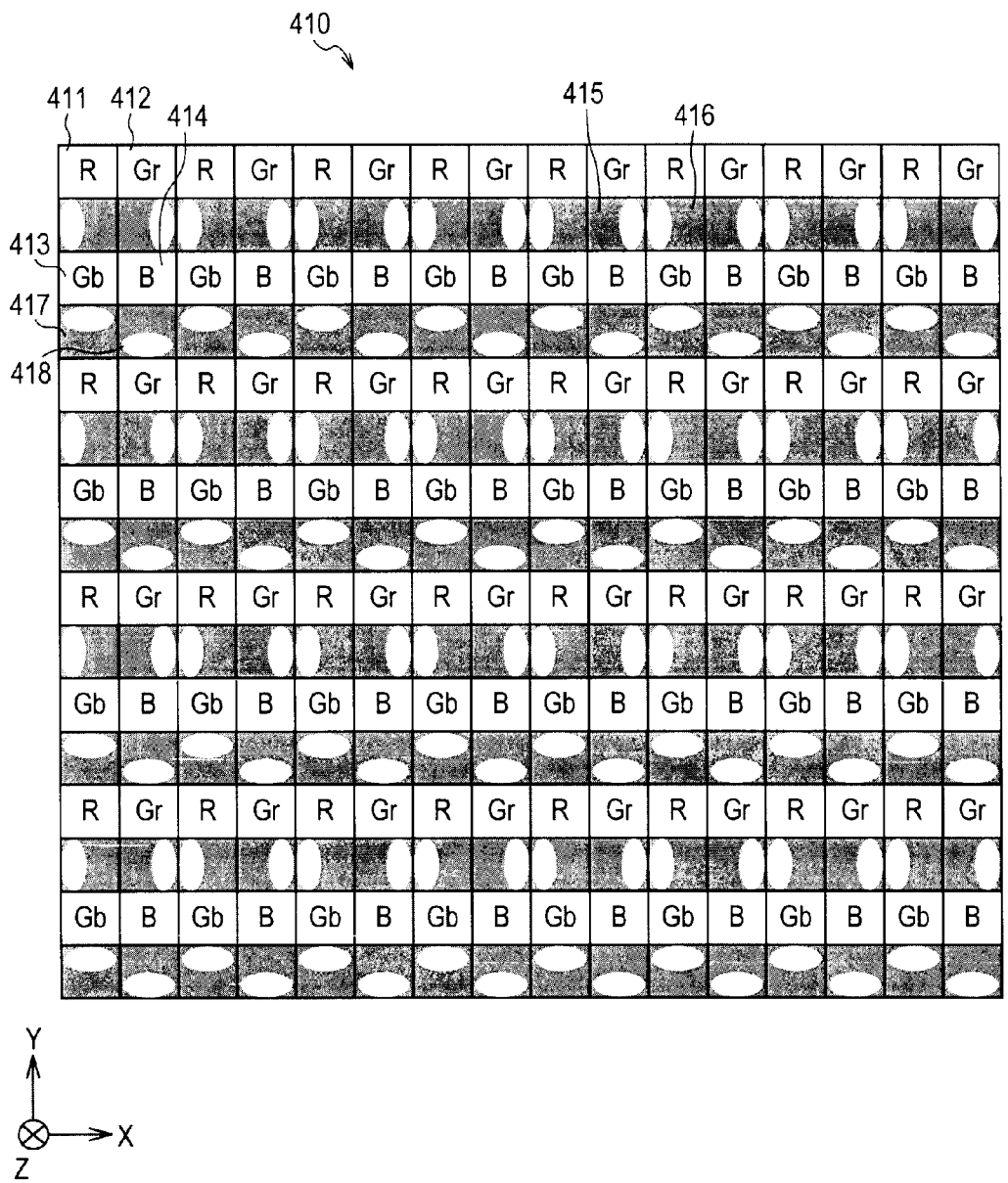
FIG. 4 is a schematic diagram showing an example of arrangement of pixels included in the imaging device according to the first embodiment of the present disclosure.

FIG. 4 is a schematic diagram showing an example of arrangement of pixels included in the imaging device 210 according to the first embodiment of the present disclosure.

In the same figure, a description will be given using an XY axis in which a vertical direction is a Y axis and a horizontal direction is an X axis. In the same figure, a left lower corner is an original point of the XY axis, a direction from bottom to top is a + side of the Y axis and a direction from left to right is a + side of the X axis. In the same figure, a specific direction (a direction corresponding to a horizontal direction (left-and-right direction) of an imaged image) of the imaging device 210 is an X-axis direction and an orthogonal direction (a direction corresponding to a vertical direction (upper-and-lower direction) of an imaged image) orthogonal to a specific direction is a Y-axis direction. A signal reading direction of the imaging device 210 is an X-axis direction (read in row units).

In the same figure, for convenience of description, a description will be given using a region (region 410) of some pixels (16×16 pixels) of pixels configuring the imaging apparatus 210. In the arrangement of the pixels of the imaging device 210, pixel arrangement shown in the region 410 is one unit and pixel arrangement corresponding to this unit (pixel arrangement corresponding to the region 410) is arrangement repeated in the X-axis direction and the Y-axis direction.

In the same figure, one pixel is denoted by one square. The image generation pixel is denoted by a square including a symbol R, G or B indicating a color filter therein. That is, the R pixel of the image generation pixel is denoted by an R pixel 411 in the same figure and the B pixel of the image generation pixel is denoted by the B pixel 414 in the same figure. With respect to the G pixel, the G pixel of a row (line) including the R pixel (R pixel 411) is denoted by a Gr pixel (Gr pixel 412) and the pixel of a row (line) including the B pixel (B pixel 414) is denoted by a Gb pixel (Gb pixel 413).

The phase difference detection pixel is denoted by a gray square to which a white ellipse is attached. In addition, the white ellipse of the phase difference detection pixel indicates a side in which incident light is not shielded by a light shielding layer and is received by a light receiving element (a side in which an opening is present in a light shielding layer). Now, the phase difference detection pixel (phase difference detection pixels 415 to 418) shown in the same figure will be described.

The phase difference detection pixel 415 is a phase difference detection pixel in which a light shielding layer is formed such that subject light passing through a right half part of an exit pupil among subject light incident to a microlens of the phase difference detection pixel 415 is shielded. That is, the phase difference detection pixel 415 shields light of the right half part of the light pupil divided into the right and left (+− side of the X-axis direction) of the exit pupil and receives the pupil divided light of the left half part.

The phase difference detection pixel 416 is a phase difference detection pixels in which a light shielding layer is formed such that subject light passing through a left half part of an exit pupil among subject light incident to a microlens of the phase difference detection pixel 416 is shielded. That is, the phase difference detection pixel 416 shields light of the left half part of the light pupil divided into the right and left (+− side of the X-axis direction) of the exit pupil and receives the pupil divided light of the right half part. The phase difference detection pixel 416 is used as a pair with the phase difference detection pixel 415 to form a pair of images.

The phase difference detection pixel 417 is a phase difference detection pixel in which a light shielding layer is formed such that subject light passing through an upper half part of an exit pupil among subject light incident to a microlens of the phase difference detection pixel 417 is shielded. That is, the phase difference detection pixel 417 shields light of the upper half part of the light pupil divided into the upper and lower side (+− side of the Y-axis direction) of the exit pupil and receives the pupil divided light of the lower half part.

The phase difference detection pixel 418 is a phase difference detection pixels in which a light shielding layer is formed such that subject light passing through a lower half part of an exit pupil among subject light incident to a microlens of the phase difference detection pixel 418 is shielded. That is, the phase difference detection pixel 418 shields light of the lower half part of the light pupil divided into the upper and lower side (+− side of the Y-axis direction) of the exit pupil and receives the pupil divided light of the upper half part. The phase difference detection pixel 418 is used as a pair with the phase difference detection pixel 417 to form a pair of images.

Now, the pixel arrangement of the imaging device 210 will be described.

In the imaging device 210, a row (line) in which the image generation pixels are arranged and a row (line) in which the phase difference detection pixel are arranged are alternately arranged. That is, as shown in FIG. 3, the image generation pixel, the phase difference detection pixel, the image generation pixel, the phase difference detection pixel, . . . are alternately arranged in the y-axis direction. In the imaging device 210, in the arrangement of only the image generation pixels except the row in which the phase difference detection pixels are arranged, the row in which the B pixel and the G pixel are arranged and the row in which the R pixel and the G pixel are arranged are alternately arranged so as to become a Bayer array.

In the imaging device 210, a line in which the phase difference detection pixel 415 and the phase difference detection pixel 416 are arranged and a line in which the phase difference detection pixel 417 and the phase difference detection pixel 418 are arranged are alternately arranged with the row of the image generation pixels interposed therebetween. That is, in the phase difference detection pixels, phase difference detection pixels pupil divided in the same direction (reading direction (right and left)) or the direction (upper and lower side) orthogonal direction orthogonal to the reading direction are arranged in row units.

Next, the cross-sectional configuration of the image generation pixel and the cross-sectional configuration of the phase difference detection pixel according to the first embodiment of the present disclosure will be described with reference to FIGS. 5A and 5B.

Figure 5A:
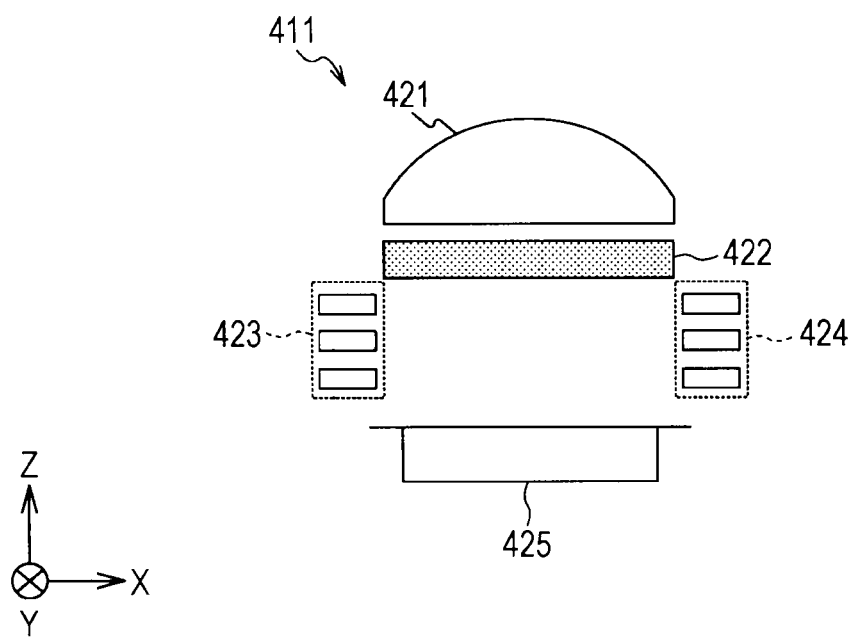
FIGS. 5A and 5B are schematic cross-sectional views showing an example of an image generation pixel and an example of a phase difference detection pixel according to the first embodiment of the present disclosure.
Figure 5B:
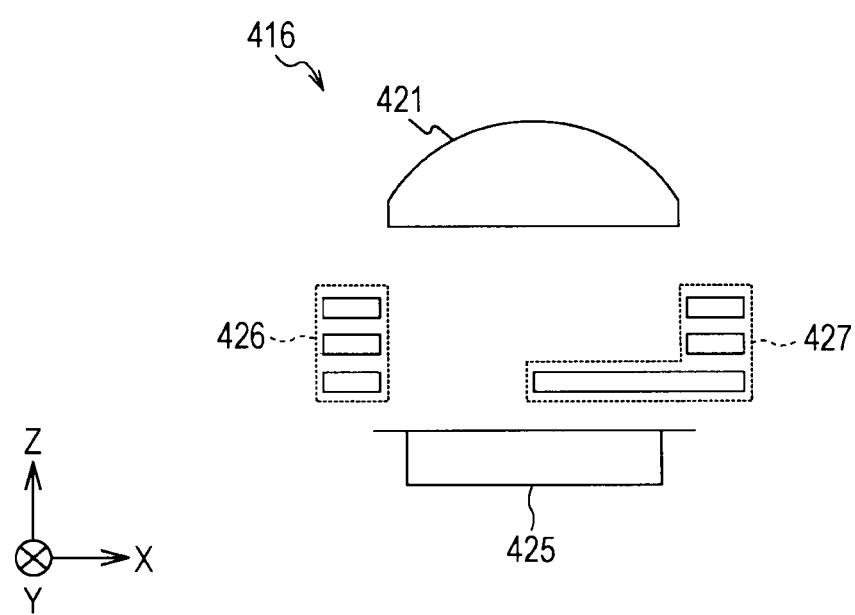

Configuration Example of Image Generation Pixel and Phase Difference Detection Pixel FIGS. 5A and 5B are schematic cross-sectional views showing an example of an image generation pixel and an example of a phase difference detection pixel according to the first embodiment of the present disclosure.

In FIG. 5A, the cross-sectional configuration of the R pixel (R pixel 411) of the image generation pixels according to the first embodiment of the present disclosure is schematically shown. A difference among the image generation pixels of three colors (R pixel, G pixel and B pixel) according to the first embodiment of the present disclosure is only a difference in color filter and thus, in FIG. 5A, only the cross-sectional configuration of the R pixel (R pixel 411) will be described. In FIGS. 5A and 5B, the cross-sectional configuration in which the right-and-left direction is an X-axis direction and an upper-and-lower direction is a Z-axis direction is shown.

In FIG. 5A, as the cross-section configuration of the R pixel 411, a microlens 421, an R filter 422, a wire 423, a wire 424 and a light receiving element 425 are shown.

The microlens 421 is a lens for focusing subject light to the light receiving element 425.

The wire 423 and the wire 424 are wires for connecting each circuit in the R pixel 411. In FIG. 5A, in the wire 423 and the wire 424, three wires are arranged in a layer shape in an optical axis. The wire 423 and the wire 424 are arranged so as not to interrupt light incident to the light receiving element 425.

The light receiving element 425 (photoelectrically) converts the received light into an electrical signal so as to generate the electrical signal of the intensity according to the quantity of received light. The light receiving element 425 includes a photo diode (PD).

In FIG. 5B, the cross-sectional configuration of the phase difference detection pixel 416 among the phase difference detection pixels according to the first embodiment of the present disclosure. A difference in cross-sectional configuration between the phase difference detection pixels 416 to 418 is only a difference in the arrangement direction of the wires which become light shielding layers and thus, in FIG. 5B, the cross-sectional configuration of the phase difference detection pixel 416 will be described.

In FIG. 5B, as the cross-sectional configuration of the phase difference detection pixel 416, a microlens 421, a light receiving element 425, a wire 426 and a wire 427 are shown. The microlens 421 and the light receiving element 425 are equal to those of FIG. 5A and thus description will be omitted.

The wire 426 and the wire 427 are wires for connecting each circuit in the phase difference detection pixel 416. In FIG. 5B, in the wire 426 and the wire 427, three wires are arranged in a layer shape in an optical axis, similarly to the wire 423 and the wire 424 of FIG. 5A.

In the wire 427, one wire protruding to the vicinity of the center of the light receiving element 425 is included. This protrusion covers the right half part of the light receiving element 425 between the light receiving element 425 and the microlens 421 and shields subject light passing the left half part of the exit pupil. The wire 426 is not arranged on the optical path of subject light from the microlens 421 to the light receiving element 425 and is arranged on the periphery of the optical path.

In the phase difference detection pixel 416, the half of the light receiving element 425 is covered by the wire 427. Thus, in the phase difference detection pixel 416, half of the light passing through the microlens 421 is shielded.

Example of the Calculation of Phase Difference Detection Pixel W Value by Phase Difference Detection Pixel W Value Calculation Unit FIGS. 6A to 6F are schematic diagrams showing an example of the calculation of a phase difference detection pixel W value calculation unit 310 according to the first embodiment of the present disclosure.

FIG. 6A schematically shows an example of the calculation of the W value of the phase difference detection pixel (phase difference detection pixel 431) which shields light of the left half part of the light pupil divided into the right and left of the exit pupil and receives pupil divided light of the right half part.

In calculation of the W value of the phase difference detection pixel 431, the phase difference detection pixel W value calculation unit 310 first calculates a pixel value (a light shielding region pixel value) related to light incident to a region shielded by the light shielding layer of the phase difference detection pixel 431 (light which is shielded by the light shielding layer and is not received by the light receiving element).

The phase difference detection pixel W value calculation unit 310 sums the pixel value of the phase difference detection pixel 431 and the calculated light shielding region pixel value of the phase difference detection pixel 431 so as to calculate the W value of the phase difference detection pixel 431.

The light shielding region pixel value ($S_{D431}$) of the phase difference detection pixel 431 is calculated, for example, using Equation 1. The W value ($W_{D431}$) of the phase difference detection pixel 431 is calculated, for example, using Equation 2.

$$S_{D431}=(I_{D431}\times 2+I_{D432}\times 1)/3 \quad (1)$$

$$W_{D431}=(I_{D431}+S_{D431})/2 \quad (2)$$

where, $I_{D431}$ denotes the pixel value of the phase difference detection pixel 431, the W value of which is to be calculated. In addition, $I_{D432}$ denotes the pixel value of the phase difference detection pixel 432 which is closest to the light shielding region of the phase difference detection pixel 431.

In FIG. 6A, the light shielding region pixel value ($S_{D431}$) corresponds to the pixel value related to light received by the region 433. The W value ($W_{D431}$) of the phase difference detection pixel 431 corresponds to the pixel value related to the W pixel 434 schematically showing the phase difference detection pixel 431 as the W pixel.

As shown in Equation 1, the light shielding region pixel value ($S_{D431}$) is calculated based on the pixel value ($I_{D431}$) of the phase difference detection pixel including the light shielding region to be calculated and the pixel value ($I_{D432}$) of the phase difference detection pixel close to the light shielding region to be calculated. As shown in Equation 1, the pixel value ($I_{D431}$) and the pixel value ($I_{D432}$) are multiplied by a weight coefficient (numerical values "2" and "1" of Equation 1) for giving a weight according to a distance between the light shielding region to be calculated and a light receiving position (white ellipse position) of each phase difference detection pixel. By performing computation using the weight coefficient, it is possible to improve calculation precision.

As shown in Equation 2, the W value of the phase difference detection pixel is calculated by a sum of the pixel value ($I_{D431}$) of the phase difference detection pixel including the light shielding region to be calculated and the pixel value ($S_{D431}$) related to light incident to the light shielding region to be calculated. The W value is an assumed value of the pixel value of the image generation pixel which receives all light of the visible light region and thus becomes higher than the G value, the R value and the B value. As shown in Equation 2, by dividing the value obtained by summing the pixel value ($I_{D431}$) of the phase difference detection pixel and the light shielding region pixel value ($S_{D431}$) by "2", the range of the gray scale of the W value becomes close to the range of the gray scale of the G value.

FIG. 6B schematically shows an example of the calculation of the W value of the phase difference detection pixel (phase difference detection pixel 432) which shields the light of the right half part of the light pupil divided into the right and left of the exit pupil and receives pupil divided light of the left half part. That is, FIG. 6B shows the calculation of the W value of the phase difference detection pixel arranged as the pair with the phase difference detection pixel shown in the calculation method of FIG. 6A.

The light shielding region pixel value ($S_{D432}$) of the phase difference detection pixel 432 is calculated, for example, using Equation 3, similarly to the light shielding region pixel value ($S_{D431}$) of the phase difference detection pixel 431. The W value ($W_{D432}$) of the phase value detection pixel 432 is calculated, for example, using Equation 4, similarly to the W value ($W_{D431}$) of the phase difference detection pixel 431.

$$S_{D432}=(I_{D432}\times 2+I_{D431}\times 1)/3 \tag{3}$$

$$W_{D432}=(I_{D432}+S_{D432})/2 \tag{4}$$

In FIG. 6B, the light shielding region pixel value ($S_{D432}$) corresponds to the pixel value related to light received by the region 437. The W value ($W_{D432}$) of the phase difference detection pixel 432 corresponds to the pixel value related to the W pixel 438 schematically showing the phase difference detection pixel 432 as the W pixel.

FIG. 6C schematically shows an example of the calculation of the W value of the phase difference detection pixel (phase difference detection pixel 441) which shields the light of the upper half part of the light pupil divided into the upper and lower sides of the exit pupil and receives pupil divided light of the lower half part.

In calculation of the W value of the phase difference detection pixel 441, similarly to calculation of the W value of the phase difference detection pixels 431 and 432 shown in FIGS. 6A and 6B, first, the light shielding region pixel value of the phase difference detection pixel 441 is calculated. The pixel value of the phase difference detection pixel 441 and the calculated light shielding region pixel value are summed to calculate the W value of the phase difference detection pixel 441.

The light shielding region pixel value ($S_{D441}$) of the phase difference detection pixel 441 is calculated, for example, using Equation 5. The W value ($W_{D441}$) of the phase difference detection pixel 441 is calculated, for example, using Equation 6.

$$S_{D441}=(I_{D441}\times 1+I_{D442}\times 1)/2 \tag{5}$$

$$W_{D441}=(I_{D441}+S_{D441})/2 \tag{6}$$

where, $I_{D441}$ denotes the pixel value of the phase difference detection pixel 441, the W value of which is to be calculated. In addition, $I_{D442}$ denotes the pixel value of the phase difference detection pixel 442 used as the pair with the phase difference detection pixel 441 between (two right and left) phase difference detection pixels which are closest to the light shielding region of the phase difference detection pixel 441.

In FIG. 6C, the light shielding region pixel value ($S_{D441}$) corresponds to the pixel value related to light received by the region 443. The W value ($W_{D441}$) of the phase difference detection pixel 441 corresponds to the pixel value related to the W pixel 444 schematically showing the phase difference detection pixel 441 as the W pixel.

As shown in Equation 5, the light shielding region pixel value ($S_{D432}$) is calculated based on the pixel value of the phase difference detection pixel including the light shielding region to be calculated and the pixel value of the phase difference detection pixel (the phase difference detection pixel of the pair) close to the light shielding region to be calculated, similarly to Equation 1 of FIG. 6A. As shown in Equation 5, since the light receiving positions of the phase difference detection pixels 441 and 442 are positioned at the same distance from the light shielding region to be calculated, a weight coefficient ("1") having the same value is used.

Equation 6 is equal to Equation 2 of FIG. 6A and thus description thereof will be omitted.

FIG. 6D schematically shows an example of the calculation of the W value of the phase difference detection pixel (phase difference detection pixel 442) which shields the light of the lower half part of the light pupil divided into the upper and lower side of the exit pupil and receives pupil divided light of the upper half part. That is, FIG. 6D shows the calculation of the W value of the phase difference detection pixel arranged as the pair with the phase difference detection pixel shown in the calculation method of FIG. 6C.

The method of calculating the light shielding region pixel value ($S_{D442}$) and the W value ($W_{D442}$) of the phase difference detection pixel 442 is equal to the calculation method of the phase difference detection pixel 441 of FIG. 6C. The light shielding region pixel value ($S_{D442}$) of the phase difference detection pixel 442 is calculated, for example, using Equation 7. The W value ($W_{D442}$) of the phase difference detection pixel 442 is calculated, for example, using Equation 8.

$$S_{D442}=(I_{D442}\times 1+I_{D441}\times 1)/2 \tag{7}$$

$$W_{D442}=(I_{D442}+S_{D442})/2 \tag{8}$$

In FIG. 6D, the light shielding region pixel value ($S_{D442}$) corresponds to the pixel value related to light received by the region 447. The W value ($W_{D442}$) of the phase difference detection pixel 442 corresponds to the pixel value related to the W pixel 448 schematically showing the phase difference detection pixel 442 as the W pixel.

The W value of the phase difference detection pixel is calculated by calculating the pixel value related to light shielded by the light shielding layer and summing the calculated pixel value and the pixel value (determined pixel value) of the phase difference detection pixel to be calculated.

FIG. 6E schematically shows the calculation of the W value of each phase difference detection pixel based on the pixel value of the phase difference detection pixels arranged in a row, in the row (row 451) in which the phase difference detection pixels pupil dividing the exit pupil to the right and left.

FIG. 6F schematically shows the calculation of the W value of each phase difference detection pixel based on the pixel value of the phase difference detection pixels arranged in a row, in the row (row 461) in which the phase difference detection pixels pupil dividing the exit pupil to the right and left.

As shown in FIGS. 6E and 6F, since the phase difference detection pixels are arranged in row units, the phase difference detection pixel W value calculation unit 310 calculates the W value of the phase difference detection pixel in row units.

Example of the Calculation of W Value of R Pixel and B Pixel by R-and-B Pixel W Value Calculation Unit FIGS. 7A to 7C are schematic diagrams showing an example of the calculation of a W value of an R pixel and a B pixel by the R-and-B pixel W calculation unit 330 according to the first embodiment of the present disclosure.

Since the method of calculating the W value of the R pixel and the method of calculating the W value of the B pixel are identical, the example of the R pixel will be described.

FIG. 7A shows 9×9 pixels centered on the R pixel, the W value of which is to be calculated. In FIG. 7A, since the W value of the phase difference detection pixel is calculated by the phase difference detection pixel W value calculation unit 310, the phase difference detection pixel is denoted by a square (hereinafter, referred to as a W pixel) having a symbol of W. In FIG. 7A, the R pixel, the W value of which is to be calculated, is denoted by a gray R pixel (R pixel 471). In FIG. 7A, the W pixel is surrounded by a thick line.

FIG. 7B shows a histogram created based on a distance specified by distance information of the phase difference detection pixel in 9×9 pixels centered on the R pixel, the W value of which is to be calculated when the R-and-B pixel W calculation unit 330 calculates the W value of the R pixel. FIG. 7B shows an example of classifying a value indicated by the distance information into 15 classes and totaling the 15 classes.

That is, FIG. 7B shows a histogram in which a horizontal axis is an axis indicating the distance classified into 15 classes, a vertical axis is an axis indicating a frequency, and distance information of a phase difference detection pixel within 9×9 pixels centered on the R pixel, the W value of which is to be calculated is classified into 15 classes. FIG. 7B shows a class (class 473 having a highest frequency and a predetermined threshold (threshold 472) using the distance of this class as a reference.

FIG. 7C schematically shows the W value of the R pixel 471 calculated by the R-and-B pixel W calculation unit 330. In FIG. 7C, the W value of the R pixel 471 calculated by the R-and-B pixel W calculation unit 330 is shown in a region (W value 476) in which a point is marked. The R value (R value 475) of the R pixel 471 generated by the imaging device 210 is shown.

Now, the flow of the calculation of the W value of the R pixel by the R-and-B pixel W calculation unit 330 will be described. First, the R-and-B pixel W calculation unit 330 selects the phase difference detection pixels in order to calculate the W value of the R pixel 471. This selection is performed using the histogram created based on the distance information of the phase difference detection pixels arranged within a predetermined range (in the same figure, an example of 9×9 pixels is shown) centered on the R pixel, the W value of which is to be calculated. In FIG. 7A, the phase difference detection pixels arranged in 9×9 pixels are shown as W pixels surrounded by a thick line. In FIG. 7B, the histogram created based on the distance information of the phase difference detection pixels is shown.

The R-and-B pixel W calculation unit 330 determines a class (473) having a highest frequency and a class belonging to a distance within a predetermined threshold (threshold 472) using the distance of this class as a reference. In FIG. 7B, the class (473) having the highest frequency and the class belonging to the distance within the predetermined threshold (threshold 472) using the distance of this class as a reference is shown by a gray class.

Subsequently, the R-and-B pixel W calculation unit 330 calculates an average value of the W values of the phase difference detection pixels belonging to the determined class (the gray class of FIG. 7B) and sets the average value to the W value of the R pixel 471. In FIG. 7C, the calculated W value of the R pixel 471 is shown as the W value 476.

In this way, the R-and-B pixel W calculation unit 330 detects the phase difference detection pixel close to the R pixel to be calculated in the distance (the distance between the imaged matter and the imaging apparatus) based on the distance information of the phase difference detection pixels arranged within the predetermined range centered on the R pixel to be calculated. The average value of the W values of the detected phase difference detection pixels becomes the W value of the R pixel to be calculated. That is, by identifying the imaged matter using the distance information, the R-and-B pixel W calculation unit 330 improves precision of interpolation of the W value of the R pixel to be calculated.

The threshold 472 is determined by a difference between a maximum value and a minimum value of the value of the distance information of the phase difference detection pixels. For example, if this difference is large, the threshold is increased, and, if this difference is small, the threshold is decreased. In addition, the number of classes and the distance gap between the classes when the histogram is created is equally determined. The threshold, the number of classes and the distance gap between the classes may be determined from the distance information of the pixels within the predetermined range centered on the pixel, the W value of which is to be calculated.

The histogram is an example of a method of detecting the phase difference detection pixels close to the R pixel to be calculated in distance specified by the distance information and the present disclosure is not limited thereto. For example, the distance information of the R pixel to be calculated may be calculated from the distance information of the phase difference detection pixels adjacent to the R pixel and the phase difference detection pixel including distance information close to the calculated distance information may be detected.

Example of the Calculation of G Value of R Pixel and B Pixel by R-and-B Pixel G Calculation Unit FIGS. 8A and 8B are schematic diagrams showing an example of the calculation of a W value of an R pixel and a B pixel by the R-and-B pixel G calculation unit 341 according to the first embodiment of the present disclosure.

Since the method of calculating the G value of the R pixel and the method of calculating the G value of the B pixel are identical, only the example of the B pixel will now be described.

FIG. 8A schematically shows 9 pixels in a row in which the B pixel and the G pixel are arranged. FIG. 8A shows 9 pixels adjacent to the B pixel (B pixel 650), the G value of which is to be calculated, in the row direction. The 9 pixels (the B pixels 610, 630, 650, 670 and 690 and the phase difference detection pixels 620, 640, 660 and 680) are pixels which hold the pixel values used when calculating the W value of the B pixel 650.

FIG. 8B shows an example of the calculation of the G value of the B pixel 650 by the R-and-B pixel G calculation unit 341 along with the pixel values of the 9 pixels shown in FIG. 8A.

As shown in the inside of the 9 pixels arranged in one row of FIG. 8B, when the R-and-B pixel G calculation unit 341 calculates the G value, the pixel value of the B pixel is configured by the B value generated by the imaging device 210 and the W value calculated by the R-and-B pixel W value calculation unit 330. The pixel value of the G (Gb) pixel is configured by the G value generated by the imaging device 210 and the W value calculated by the R-and-B pixel W value calculation unit 330.

In FIG. 8B, the B values of the B pixels (610, 630, 650, 670 and 690) are denoted by B values 613, 633, 653, 573 and 693 and the W values of the B pixels are denoted by the W values 614, 634, 654, 674 and 694.

In FIG. 8B, the G values of the Gb pixels (620, 640, 660 and 680) are denoted by G values 621, 641, 661 and 681 and the W values of the Gb pixels are denoted by the W values 624, 644, 664 and 684.

Now, calculation of the G value of the B pixel 650 by the R-and-B pixel G calculation unit 341 will be described. In calculation of the G value of the B pixel 650, the R-and-B pixel G calculation unit 341 calculates the G value based on high correlation between the G value and the W value and the W value of the B pixel 650.

The G value ($G_{B650}$) of the B pixel 650 is calculated, for example, using Equations 9 to 11.

$$G_{B650} = (G_m/W_m) \times W_{B650} \quad (9)$$

$$G_m = a \times G_{G620} + b \times G_{G640} + c \times G_{G660} + d \times G_{G680} \quad (10)$$

$$W_m = e \times W_{B610} + f \times W_{B650} + g \times W_{B690} \quad (11)$$

where, $G_{G620}$ is the G value of the G pixel 620. In addition, $G_{G640}$ is the G value of the G pixel 640, $G_{G660}$ is the G value of the G pixel 660, $G_{G660}$ is the G value of the G pixel 680. In addition, $W_{B610}$ is the W value of the B pixel 610, $W_{B650}$ is the W value of B pixel 650, and $W_{B690}$ is the W value of the B pixel 690.

In addition, a to g are weight coefficients. The weight coefficients a to g are set to satisfy the relationships of Equations 12 to 14.

$$a+b+c+d=e+f+g \quad (12)$$

$$a=d<b=c \quad (13)$$

$$e=h<f \quad (14)$$

The weight coefficients a to g are set, for example, according to the relationship between the position of the pixel, the G value of which is to be calculated, and the position of the pixel which holds each pixel value. That is, $G_m$ is a low frequency component of the G value calculated by applying a low pass filter using the position of the B pixel 650 as a reference. In addition, $W_m$ is a low frequency component of the W value calculated by applying a low pass filter using the position of the B pixel 650 as a reference.

Here, it is assumed that the value of the weight coefficients a and d is "1" and the value of the weight coefficients b and c is "3", the value of the weight coefficients e and h is "1", and the value of the weight coefficient f is "6". In this case, Equations 10 and 11 become Equations 15 and 16.

$$G_m = 1 \times G_{G620} + 3 \times G_{G640} + 3 \times G_{G660} + 1 \times G_{G680} \quad (15)$$

$$W_m = 1 \times W_{B610} + 6 \times W_{B650} + 1 \times W_{B690} \quad (16)$$

$G_m/W_m$ of the left side of Equation 9 indicates correlation between the low frequency component of the G value using the position of the B pixel 650 as a reference and the low frequency component of the W value using the position of the B pixel 650 as a reference. That is, as shown in Equation 9, the G value of the B pixel 650 is calculated based on the correlation between the low frequency components and the W value of the B pixel 650.

In FIG. 8B, the G value ($G_{B650}$) of the B pixel 650 corresponds to the G value 651 (region in which a point is marked) shown in the B pixel 650 shown below an arrow. The pixel values used when calculating the G value ($G_{B650}$) correspond to the pixel values (the W values 614, 654 and 694 and the G values 621, 641, 661 and 681) surrounded by a thick line of the 9 pixels arranged in one row.

Calculation of $G_m$ and $W_m$ is only exemplary and other methods of setting various weight coefficients (a method of applying a low pass filter) may be used.

The method of calculating the W value of the R pixel and the B pixel is not limited thereto and, for example, as shown in FIGS. 7A to 7C, a calculation method using a histogram or the like may be used.

Now, interpolation of the phase difference detection pixel G value calculation unit 342, the R value calculation unit 360 and the B value calculation unit 370 will be briefly described.

The phase difference detection pixel G value calculation unit 342, the R value calculation unit 360 and the B value calculation unit 370 perform interpolation, similarly to calculation of the W value of the R pixel and the B pixel by the R-and-B pixel W calculation unit 330 shown in FIGS. 7A to 7C.

That is, the distance information of the image generation pixel is calculated from the distance information of the phase difference detection pixel adjacent to the image generation pixel. A histogram is created based on the calculated distance information, a pixel, the pixel value of which is referred to, is determined from the histogram, and an average value of the pixel value of a target color of interpolation of the referred pixel is calculated, thereby performing interpolation.

Example of Demosaicing Process Using W Value

FIGS. 9A and 9B are schematic diagrams showing an example of a demosaicing process using a W value by the demosaicing unit 300 of the imaging apparatus 100 according to the first embodiment of the present disclosure and an example of a demosaicing process of an imaging apparatus of the related art. In FIGS. 9A and 9B, for convenience of description, a region of 6×6 pixels is shown and described.

FIG. 9A shows an example of a demosaicing process of the imaging apparatus of the related art. In FIG. 9A, for convenience of description, it is assumed that arrangement of pixels in the imaging device is equal to the arrangement of pixels in the imaging device of the embodiment of the present disclosure. FIG. 9A shows a region (region 717) indicating the arrangement of pixels in the imaging device, a region (region 718) indicating the pixel values used in the demosaicing process, and a region (region 719) indicating the result of the demosaicing process.

In the imaging apparatus of the related art including the imaging device (region 717 of FIG. 9A) having the same arrangement of pixels as the embodiment of the present disclosure, the demosaicing process is performed only using the pixel values generated by the image generation pixels. The pixel values generated by the phase difference detection pixels are only used to detect a phase difference.

That is, as shown by the region 718, in the demosaicing process, the color information of the positions of the image generation pixels and the phase difference detection pixels are interpolated (demosaicing process) based on the pixel value generated by the image generation pixel (the pixel values of 18 pixels surrounded by a thick line of the region 718). As shown by the region 719, the color information (R value, G value and B value) of all pixels are interpolated even when the demosaicing process is performed only using the pixel value generated by the image generation pixel.

However, since only the pixel values generated by the image generation pixels are used as shown by the region 718, the number of pieces of information (pixel values) used for interpolation is decreased by the number of phase difference detection pixels. Accordingly, if the image data of the imaging device (imaging device 210) of the embodiment of the present disclosure in which the number of phase difference detection pixels becomes equal to the number of image generation pixels is subjected to the demosaicing process, the number of pieces of information used for interpolation is decreased and thus deterioration in precision of the demosaicing process occurs.

FIG. 9B shows an example of the demosaicing process in the imaging apparatus 100 according to the first embodiment of the present disclosure. FIG. 9B shows a region (region 711) indicating the arrangement of pixels in the imaging device 210, a region (region 712) indicating the pixel values used for the demosaicing process and a region (region 713) indicating the result of the demosaicing process. In the region 712, the pixel value of the phase difference detection pixel is denoted by the W value calculated by the phase difference detection pixel W value calculation unit 310.

In the imaging apparatus 100 according to the first embodiment of the present disclosure, the pixel values of the phase difference detection pixels and the W values of the phase difference detection pixels are calculated and the demosaicing process is performed using the calculated W values of the phase difference detection pixels and the pixel values generated by the image generation pixels. That is, as shown by the region 712, in the demosaicing process, the color information of the positions of the image generation pixels and the phase difference detection pixels are interpolated based on the pixel values of 36 pixels surrounded by a thick line in the region 712. In the region 713, the color information (R value, G value and B value) of all pixels are interpolated.

In the imaging apparatus 100 according to the first embodiment of the present disclosure, the W values of the phase difference detection pixels are calculated from the pixel values of the phase difference detection pixels and the W values are used for the demosaicing process. Accordingly, the number of pieces of information used for interpolation is increased and thus precision of the demosaicing process may be improved.

Example of Demosaicing Process Using Distance Information

Figure 10A:
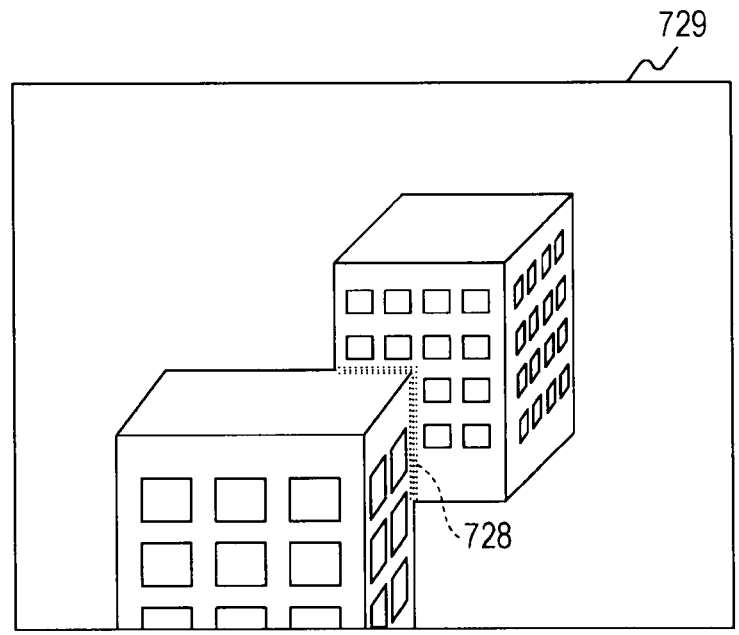
FIGS. 10A and 10B are schematic diagrams showing an example of a demosaicing process using distance information by the demosaicing unit of the imaging apparatus according to the first embodiment of the present disclosure and an example of a demosaicing process of an imaging apparatus of the related art.
Figure 10B:
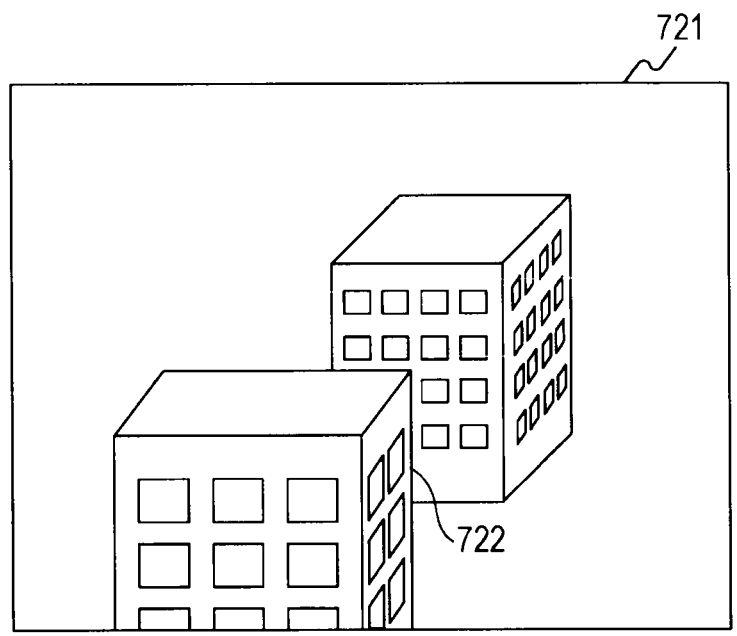

FIGS. 10A and 10B are schematic diagrams showing an example of a demosaicing process using distance information by the demosaicing unit 300 of the imaging apparatus 100 according to the first embodiment of the present disclosure and an example of a demosaicing process of an imaging apparatus of the related art. In the imaging apparatus of the related art, the same apparatus as that shown in FIG. 9A is described.

FIG. 10A shows an imaged image (imaged image 729) after the demosaicing process by the imaging apparatus of the related art. In the imaged image 729, two buildings having different distances from the imaging apparatus is imaged such that portions thereof overlap each other are shown. It is assumed that the outer walls of the two buildings have similar colors. In the imaged image 729, collapse of the edge between the two buildings is expressed by representing the edge between the two buildings by a dotted line (dotted line 728).

In the demosaicing process of the imaging apparatus of the related art, the color information is interpolated based on the pixel values of the pixels arranged in a predetermined range. That is, a determination as to whether the pixel, the pixel value of which is referred to, is a pixel by which an object different from an object imaged by the pixel to be interpolated is imaged is not made. Therefore, in the pixels (pixels adjacent to the edge between the two buildings of the imaged image 729) adjacent to a place where objects having the same color and having different distances from the imaging apparatus are adjacent to each other, it is erroneously determined that the adjacent objects are the same object.

Accordingly, in the demosaicing process of the imaging apparatus of the related art, interpolation precision may deteriorate.

FIG. 10B shows an imaged image (imaged image 721 after the demosaicing process by the imaging apparatus 100 according to the first embodiment of the present disclosure. It is assumed that the subjects of FIG. 10B are equal to the subjects (two buildings) of FIG. 10A. In the imaged image 721, the sharpness of the edge between the two buildings is expressed by representing the edge between the two buildings by a solid line (line 722).

In the demosaicing process according to the first embodiment of the present disclosure, the pixel, the pixel value of which is referred to, is selected using the distance information. That is, a determination as to whether the pixel, the pixel value of which is referred to, is a pixel by which an object different from an object imaged by the pixel to be interpolated is imaged is made. The pixel values of the pixels to be interpolated are interpolated by referring to the pixel values of the pixels by which the same object is imaged.

That is, in the pixels of a place where objects having the same color and having different distances from the imaging apparatus are adjacent to each other (the pixels adjacent to the edge between the two buildings of the imaged image 721), the objects imaged by the pixels are identified using the distance information. Interpolation of the pixel values is performed by referring to the pixel values of the pixels by which the same object as the pixels to be interpolated is imaged. Accordingly, the edge (line 722) of a place where the objects having the same color are adjacent to each other becomes sharp (interpolation precision is improved).

In the imaging apparatus 100 according to the first embodiment of the present disclosure, in the demosaicing process, it is possible to improve prevision of the demosaicing process by selecting the pixels, the pixel values of which are referred to, using the distance information.

Example of Operation of Imaging Apparatus

Next, the operation of the imaging apparatus 100 according to the first embodiment of the present disclosure will be described with reference to the figures.

Figure 11:
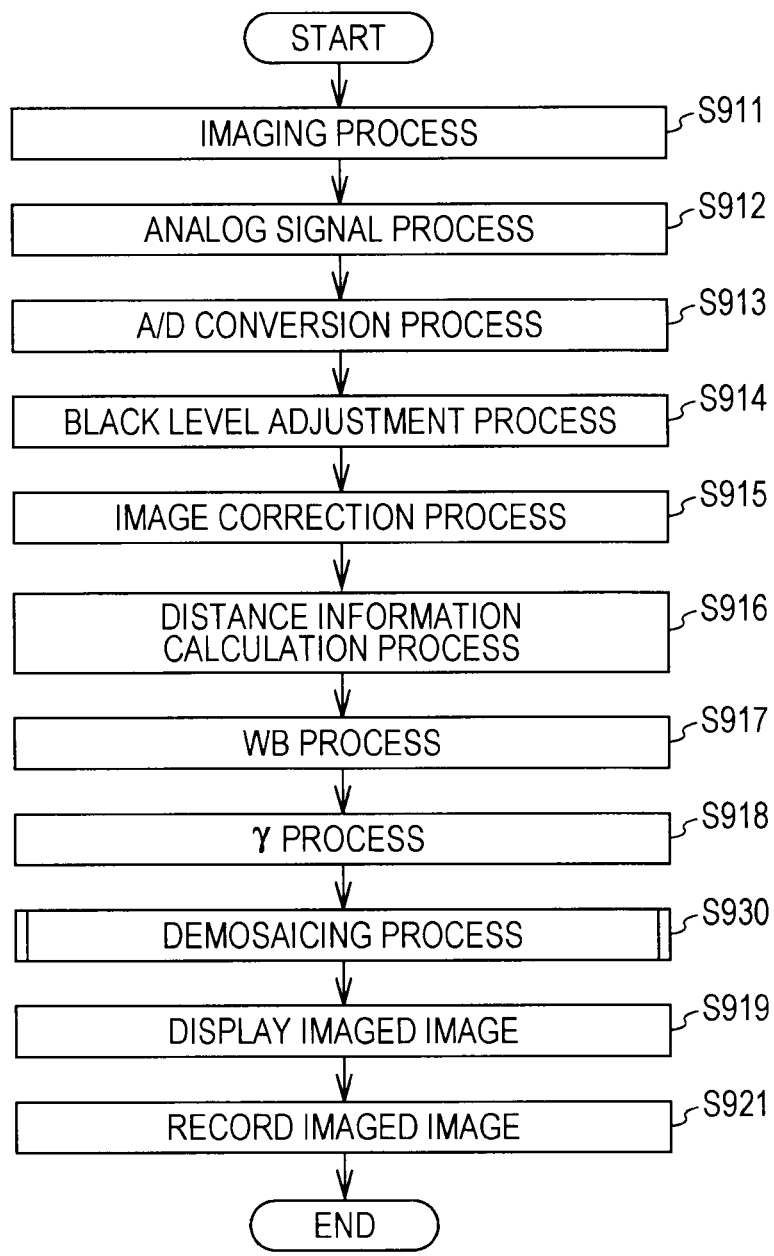
FIG. 11 is a flowchart illustrating an example of an imaging processing procedure by the imaging apparatus according to the first embodiment of the present disclosure.

FIG. 11 is a flowchart illustrating an imaging processing procedure by the imaging apparatus 100 according to the first embodiment of the present disclosure. FIG. 11 shows a flow in which the imaging device 210 images a subject and the image imaged by imaging is held in the recording unit 282.

First, an imaging process of imaging the subject using the imaging device 210 is performed (step S911). Then, through the analog signal processing unit 220, an analog signal process of performing a predetermined analog signal process with respect to the analog image signal generated by imaging of the imaging device 210 is performed (step S912).

Thereafter, through the A/D converter 230, the analog image signal after the analog signal process of the analog signal processing unit 220 is converted into a digital image signal by an A/D conversion process (step S913).

Subsequently, through the black level processing unit 240, a black level correction process of correcting the black level of the digital image signal obtained by the A/D converter 230 is performed (step S914).

Through the image correction unit 250, an image correction process of performing correction such as defect correction, shading correction, mixed color correction or the like is performed with respect to the image signal after black level correction (step S915). Thereafter, through the distance information calculation unit 260, a distance information calculation process of calculating the distance information of a place where the phase difference detection pixels are arranged is performed based on the image signal of the phase difference detection pixels supplied from the image correction unit 250 (step S916).

Subsequently, through the WB processing unit 270, a WB process of correcting white balance (WB) of the image signal supplied from the image correction unit 250 is performed (step S917). Then, through the γ correction unit 275, the γ correction process is performed with respect to the image signal after the WB process (step S918). Thereafter, through the demosaicing unit 300, a demosaicing process is performed based on the image signal (image data) after γ correction and the distance information such that all channels of R, G and B are aligned at each pixel position (step S930). The demosaicing process (step S930) will be described with reference to FIG. 12.

Through the display unit 281, the imaged image after the demosaicing process is displayed (step S919). Through the recording unit 282, the imaged image after the demosaicing process is recorded (step s921). The imaging process procedure is finished.

Figure 12:
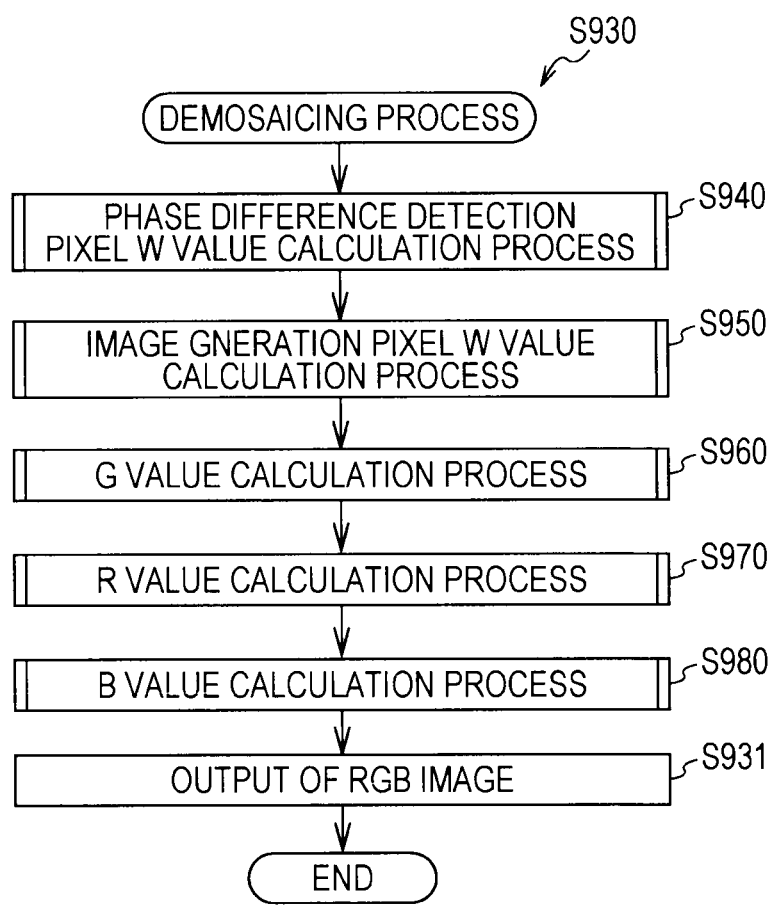
FIG. 12 is a flowchart illustrating an example of a processing procedure of a demosaicing process (step S930) of an imaging process operation according to the first embodiment of the present disclosure.

FIG. 12 is a flowchart illustrating a processing procedure of a demosaicing process (step S930) of an imaging process operation according to the first embodiment of the present disclosure.

First, through the phase difference detection pixel W value calculation unit 310, a phase difference detection pixel W value calculation process of calculating the W value (phase difference detection pixel W value) of the phase difference detection pixel is performed (step S940). The phase difference detection pixel W value calculation process (step S940) will be described with reference to FIG. 13. Step S940 is an example of an estimation procedure described in the claims.

Subsequently, through the R-and-B pixel W value calculation unit 330, an image generation pixel W value calculation process of calculating the W values of the R pixel and the B pixel among the image generation pixels is performed based on the phase difference detection pixel W value and the distance information supplied from the distance information calculation unit 260 (step S950). The image generation pixel W value calculation process (step S950) will be described with reference to FIG. 14.

Through the R-and-B pixel G value calculation unit 341 and the phase difference detection pixel G value calculation unit 342, a G value calculation process of calculating the phase difference detection pixel, the R pixel and the B pixel is performed (step S960). The G value calculation process (step S960) will be described with reference to FIG. 15.

Thereafter, through the R value calculation unit 360, an R value calculation process of calculating the R values of the phase difference detection pixel, the G pixel and the B pixel is performed (step S970). The R value calculation process (step S970) will be described with reference to FIG. 16.

Subsequently, through the B value calculation unit 370, a B value calculation process of calculating the B values of the phase difference detection pixel, the R pixel and the G pixel is performed (step S980). The B value calculation process (step S980) will be described with reference to FIG. 17. Steps S950, S960, S970 and S980 are an example of an interpolation procedure of the claims.

Through the image synthesis unit 380, a RGB image is synthesized, the synthesized image is output (step S931), and the demosaicing processing procedure is finished.

Figure 13:
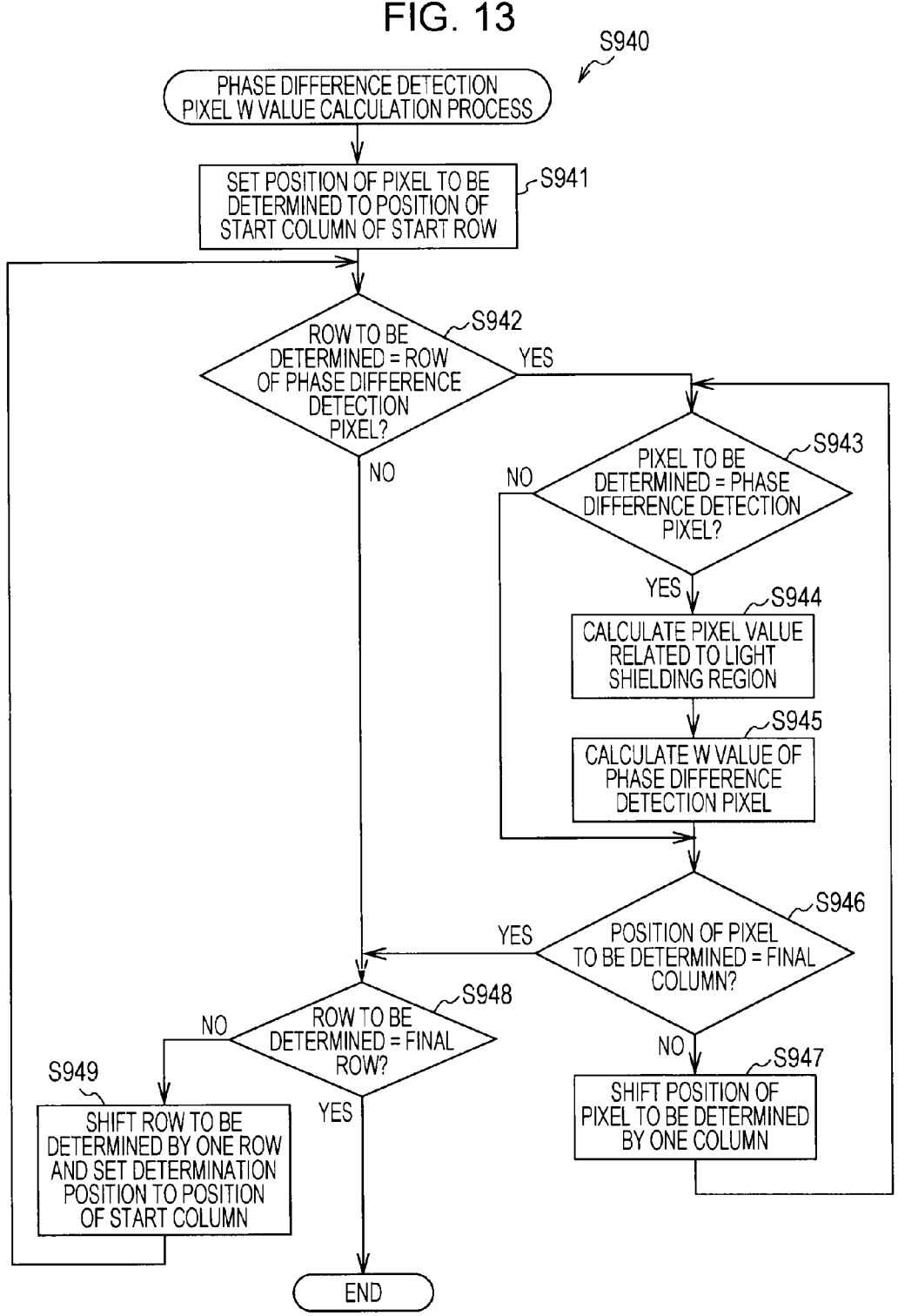
FIG. 13 is a flowchart illustrating an example of a processing procedure of a phase difference detection pixel W value calculation process (step S940) by the phase difference detection pixel W value calculation unit according to the first embodiment of the present disclosure.

FIG. 13 is a flowchart illustrating a processing procedure of a phase difference detection pixel W value calculation process (step S940) by the phase difference detection pixel W value calculation unit 310 according to the first embodiment of the present disclosure.

First, the position of the pixel (pixel to be determined) subjected to a determination as to whether or not the W value thereof is calculated is set to the position of a start column of a start row of determination (step S941). Subsequently, it is determined whether or not the row (row to be determined) in which the pixel to be determined is arranged is a row in which a phase difference detection pixel is arranged (step S942).

If it is determined that the row to be determined is the row in which the phase difference detection pixel is arranged (step S942), it is determined whether or not the pixel to be determined is a phase difference detection pixel (step S943). If it is determined that the pixel to be determined is not the phase difference detection pixel (step S943), the process progresses to step S946.

If it is determined that the pixel to be determined is the phase difference detection pixel (step S943), a pixel value (light shielding region pixel value) of a light shielding region included in the phase difference detection pixel is calculated (step S944). The light shielding region pixel value is calculated, for example, using Equations 1, 3, and 7 shown in FIGS. 6A to 6F. Subsequently, the W value of the phase difference detection pixel is calculated (step S945). The W value of the phase difference detection pixel is calculated, for example, using Equations 2, 4, 6 and 8 shown in FIGS. 6A to 6F.

Thereafter, it is determined whether or not the position of the pixel to be determined is a last column (final column) to be determined (step S946). If it is determined that the position of the pixel to be determined is the final column (step S946), the process progresses to step S948.

If it is determined that the position of the pixel to be determined is not the final column (step S946), the position of the pixel to be determined is shifted by one column (step S947) and the process returns to step S943.

If it is determined that the row to be determined is not the row in which the phase difference detection pixel is arranged (the row of the image generation pixel) (step S942), it is determined whether or not the row to be determined is a last row (final row) to be determined (step S948). If it is determined that the row to be determined is not the final row (step S948), the position of the pixel to be determined is set to the position of the start column of a row after the row to be determined is shifted by one row (step S949) and the process returns to step S942 to continue to make the determination.

If it is determined that the row to be determined is the final row (step S948), the phase difference detection pixel W value calculation processing procedure is finished.

Figure 14:
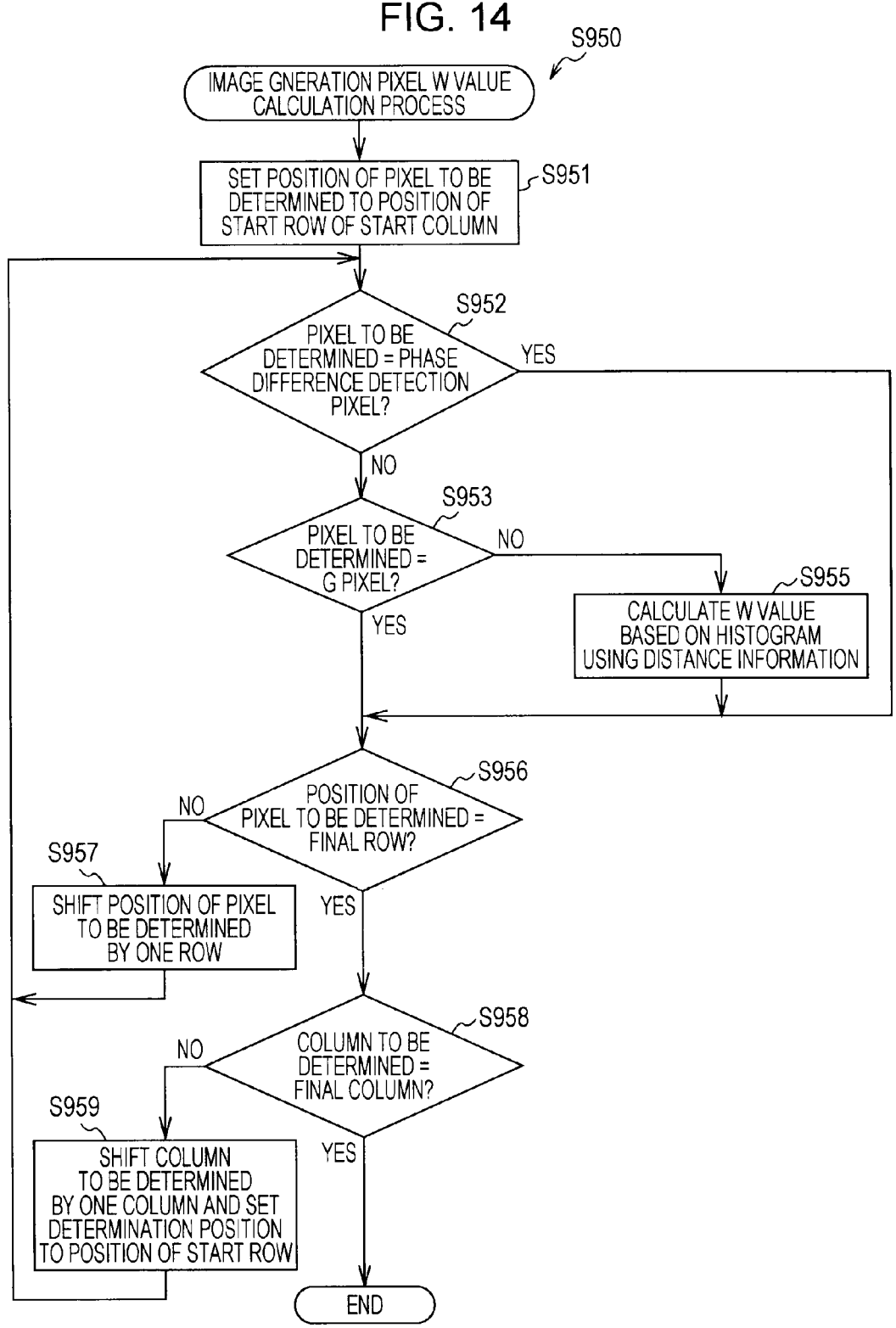
FIG. 14 is a flowchart illustrating an example of a processing procedure of an image generation pixel W value calculation process (step S950) by the R-and-B pixel W value calculation unit according to the first embodiment of the present disclosure.

FIG. 14 is a flowchart illustrating a processing procedure of an image generation pixel W value calculation process (step S950) by the R-and-B pixel W value calculation unit 330 according to the first embodiment of the present disclosure.

First, the position of the pixel (pixel to be determined) subjected to a determination as to whether or not the W value thereof is calculated is set to the position of a start row of a start column of determination (step S951). Subsequently, it is determined whether or not the pixel to be determined is a phase difference detection pixel (step S952). If it is determined that the pixel to be determined is the phase difference detection pixel (step S952), the process progresses to step S956.

If it is determined that the pixel to be determined is not the phase difference detection pixel (it is image generation pixel) (step S952), it is determined whether or not the pixel to be determined is a G pixel (step S953). If it is determined that the pixel to be determined is the G pixel (step S953), the process progresses to step S956.

If it is determined that the pixel to be determined is not the G pixel (it is an R pixel or a B pixel) (step S953), the W value of the pixel to be determined (R pixel and B pixel) is calculated based on a histogram using distance information (step S955). The W value of the R pixel or the B pixel is calculated, for example, as described with reference to FIGS. 7A to 7C.

Subsequently, it is determined whether or not the position of the pixel to be determined is a last row (final row) (step S956). If it is determined that the position of the pixel to be determined is not the final row (step S956), the position of the pixel to be determined is shifted by one row (step S957) and the process returns to step S952.

If it is determined that the position of the pixel to be determined is the final row (step S956), it is determined whether or not the column (column to be determined) in which the pixel to be determined is arranged is a last column (final column) to be determined (step S958). If it is determined that the column to be determined is not the final column (step S958), the position of the pixel to be determined is set to the position of the start row of the column after the column to be determined is shifted by one column (step S959) and the process returns to step S952 to continues to make the determination.

If it is determined that the column to be determined is the final column (step S958), the image generation pixel W value calculation processing procedure is finished.

Figure 15:
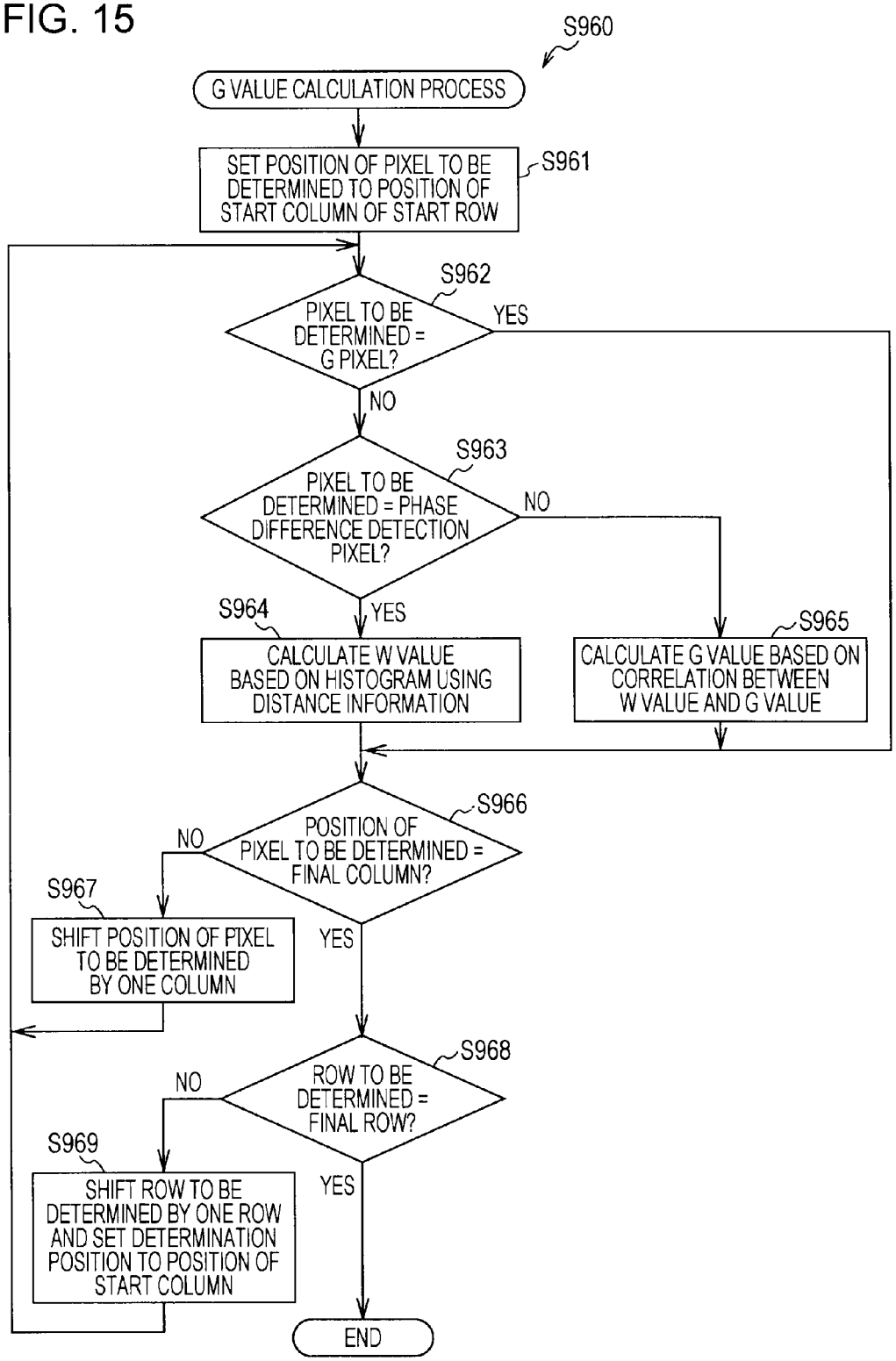
FIG. 15 is a flowchart illustrating an example of a processing procedure of a G value calculation process (step S960) by an R-and-B pixel G value calculation unit and a phase difference detection pixel G value calculation unit according to the first embodiment of the present disclosure.

FIG. 15 is a flowchart illustrating a processing procedure of a G value calculation process (step S960) by the R-and-B pixel G value calculation unit 341 and the phase difference detection pixel G value calculation unit 342 according to the first embodiment of the present disclosure.

First, the position of the pixel (pixel to be determined) subjected to a determination as to whether or not the G value thereof is calculated is set to the position of a start column of a start row of determination (step S961). Subsequently, it is determined whether or not the pixel to be determined is a G pixel (step S962). If it is determined that the pixel to be determined is the G pixel (step S962), the process progresses to step S966.

If it is determined that the pixel to be determined is not the G pixel (step S962), it is determined whether or not the pixel to be determined is a phase difference detection pixel (step S963). If it is determined that the pixel to be determined is the phase difference detection pixel (step S963), the distance information of the image generation pixel is set and then the G value of the pixel to be determined is calculated using the histogram using the distance information (step S964). After the G value is calculated (step S964), the process progresses to step S966.

If it is determined that the pixel to be determined is not the phase difference detection pixel (it is the R pixel or the B pixel) (step S963), the G value is calculated using correlation between the W value and the G value (step S965). The G value of the R pixel or the B pixel is calculated, for example, using Equations 9 to 14 shown in FIGS. 8A and 8B.

Subsequently, it is determined whether or not the position of the pixel to be determined is a last column (final column) (step S966). If it is determined that the position of the pixel to be determined is not the final column (step S966), the position of the pixel to be determined is shifted by one column (step S967) and then the process returns to step S962.

If it is determined that the position of the pixel to be determined is the final column (step S966), it is determined whether or not the row (row to be determined) in which the pixel to be determined pixel is arranged is a last row (final row) to be determined (step S968). If it is determined that the row to be determined is not the final row (step S968), the position of the pixel to be determined is set to the position of the start column of the row after the row to be determined is shifted by one row (step S969) and the process returns to step S962 to continue to the determination.

If it is determined that the row to be determined is the final row (step S968), the G value calculation processing procedure is finished.

Figure 16:
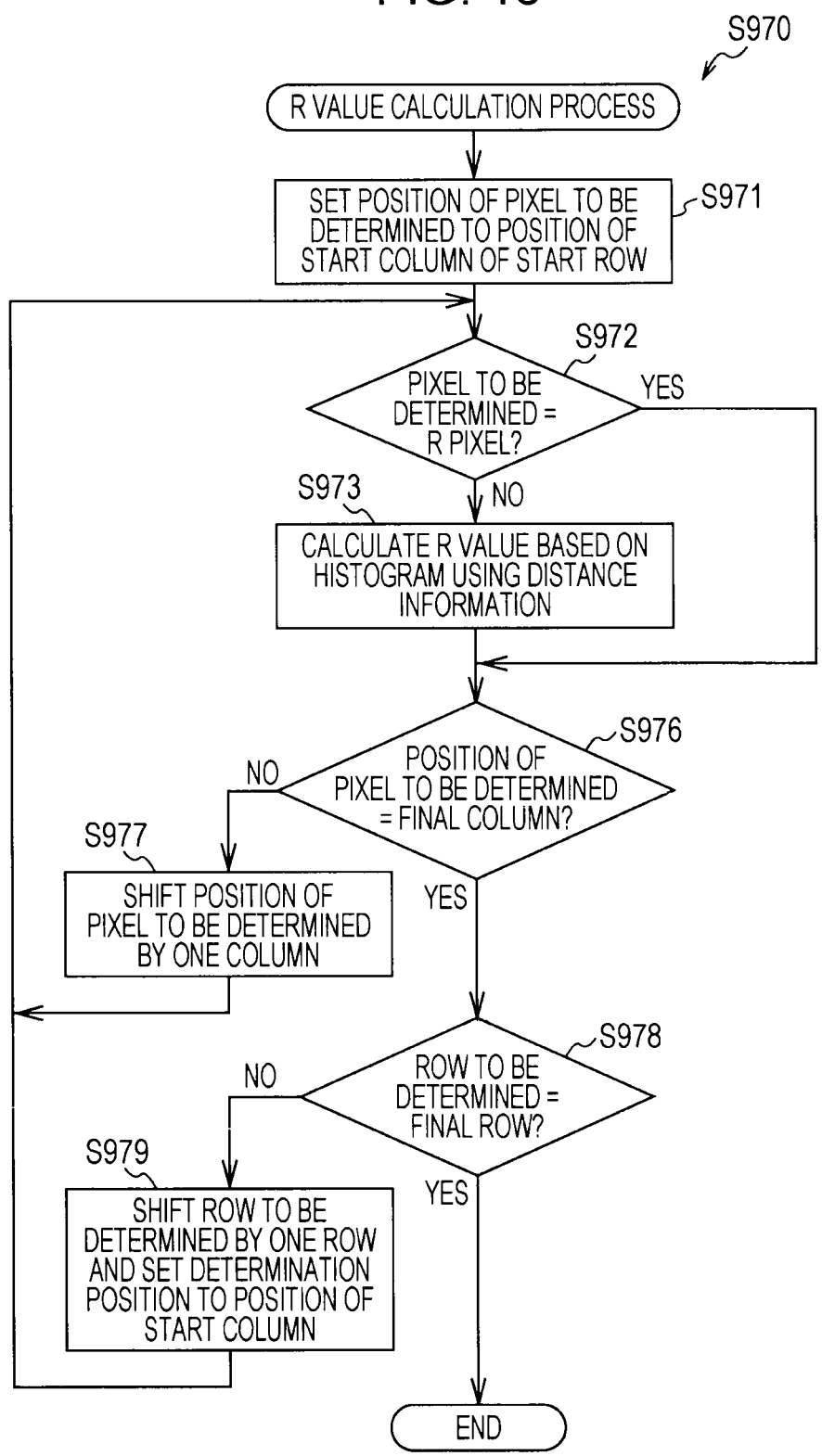
FIG. 16 is a flowchart illustrating an example of a processing procedure of an R value calculation process (step S970) by an R value calculation unit according to the first embodiment of the present disclosure.

FIG. 16 is a flowchart illustrating a processing procedure of an R value calculation process (step S970) by the R value calculation unit 360 according to the first embodiment of the present disclosure.

The step S971, step S976 to step S979 of the processing procedure respectively correspond to step S961, step S966 to step S969 shown in FIG. 15 and thus description thereof will be omitted.

If the position of the pixel to be determined of the R value is set to the position of the start column of the start row (step S971), it is determined whether or not the pixel to be determined is an R pixel (step S972). If it is determined that the pixel to be determined is the R pixel (step S972), the process progresses to step S976.

If it is determined that the pixel to be determined is not the R pixel (step S972), the distance information of the image generation pixel is set and the R value of the pixel to be determined (the phase difference detection pixel, the G pixel or the B pixel) is calculated using the histogram using the distance information (step S973). After the R value is calculated (step S973), the process progresses to step S976. The R value is calculated, for example, as described with reference to FIGS. 7A to 7C.

Figure 17:
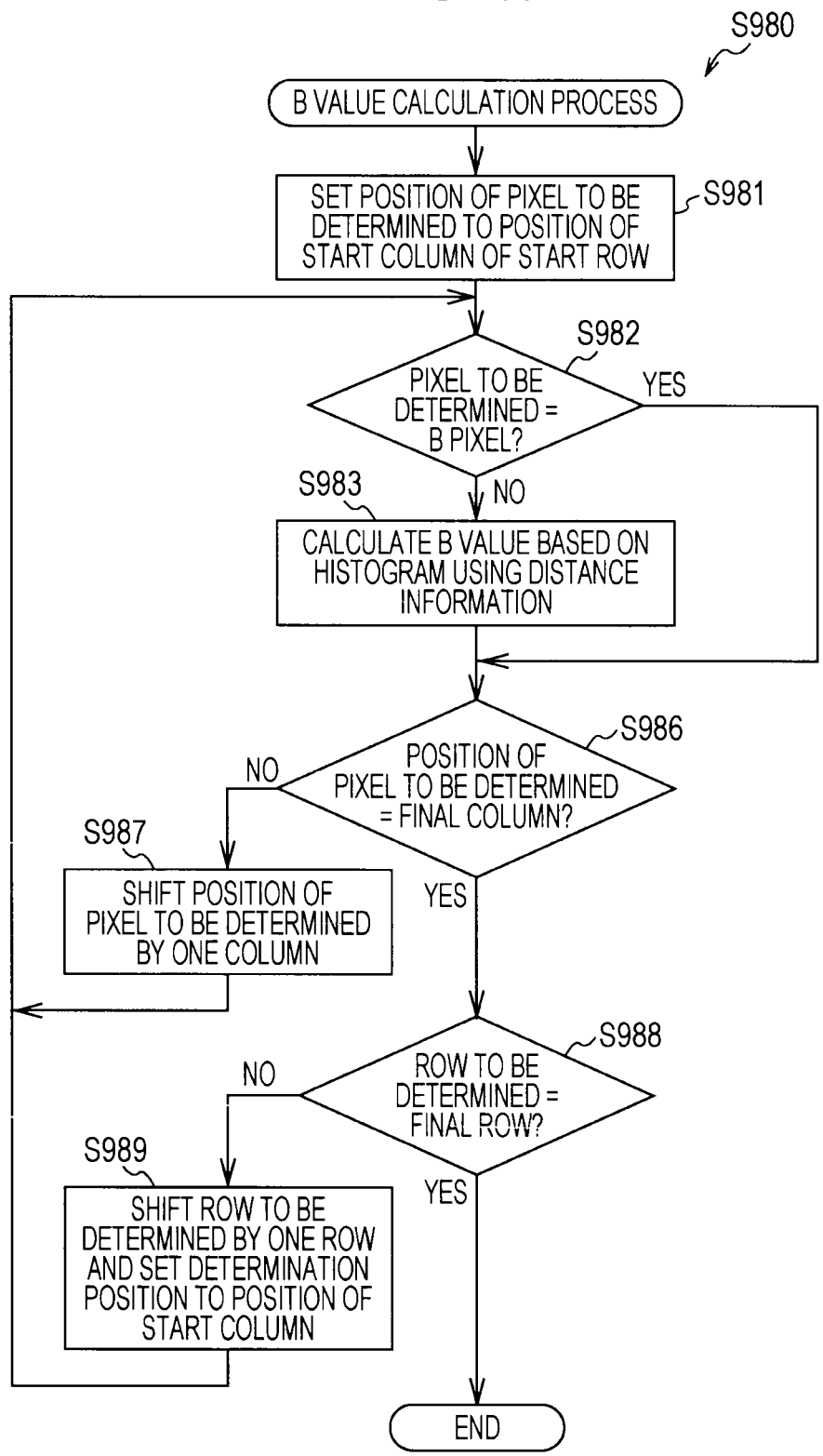
FIG. 17 is a flowchart illustrating an example of a processing procedure of a B value calculation process (step S980) by a B value calculation unit according to the first embodiment of the present disclosure.

FIG. 17 is a flowchart illustrating a processing procedure of a B value calculation process (step S980) by the B value calculation unit 370 according to the first embodiment of the present disclosure.

Step S981, step S986 to step S989 of the processing procedure respectively correspond to step S961, step s966 to step S969 shown in FIG. 15 and thus description thereof will be omitted.

If the position of the pixel to be determined of the B value is set to the position of the start column of the start row (step S981), it is determined whether or not the pixel to be determined pixel is a B pixel (step S982). If it is determined that the pixel to be determined is the B pixel (step S982), the process progresses to step S986.

If it is determined that the pixel to be determined is not the B pixel (step S982), the distance information of the image generation pixel is set and then the B value of the pixel to be determined (the phase difference detection pixel, the R pixel or the G pixel) is calculated using the histogram using the distance information (step S983). After the B value is calculated (step S983), the process progresses to step S986. The B value is calculated, for example, as described with reference to FIGS. 7A to 7C.

According to the first embodiment of the present disclosure, it is possible to improve image quality of image data by using the pixel value of the phase difference detection pixel and the distance information generated from the pixel value of the phase difference detection pixel in the demosaicing process.

2. Second Embodiment

Although the example of calculating the G value of the phase difference detection pixel using the histogram for the distance is described in the first embodiment, the present disclosure is not limited thereto and calculation may be performed based on correlation between the W value and the G value. Even in the R value and the B value, calculation may be performed based on correlation between the W value and the R value or correlation between the W value and the B value, precision of which is lower than that of correlation between the W value and the G value (correlation between the W value and the G value is highest).

In the second embodiment of the present disclosure, an example of calculating the W value of the G pixel and calculating the G value of the phase difference detection pixel using the calculated W value of the G pixel will be described with reference to FIGS. 18 to 21.

Functional Configuration Example of Demosaicing Unit

Figure 18:
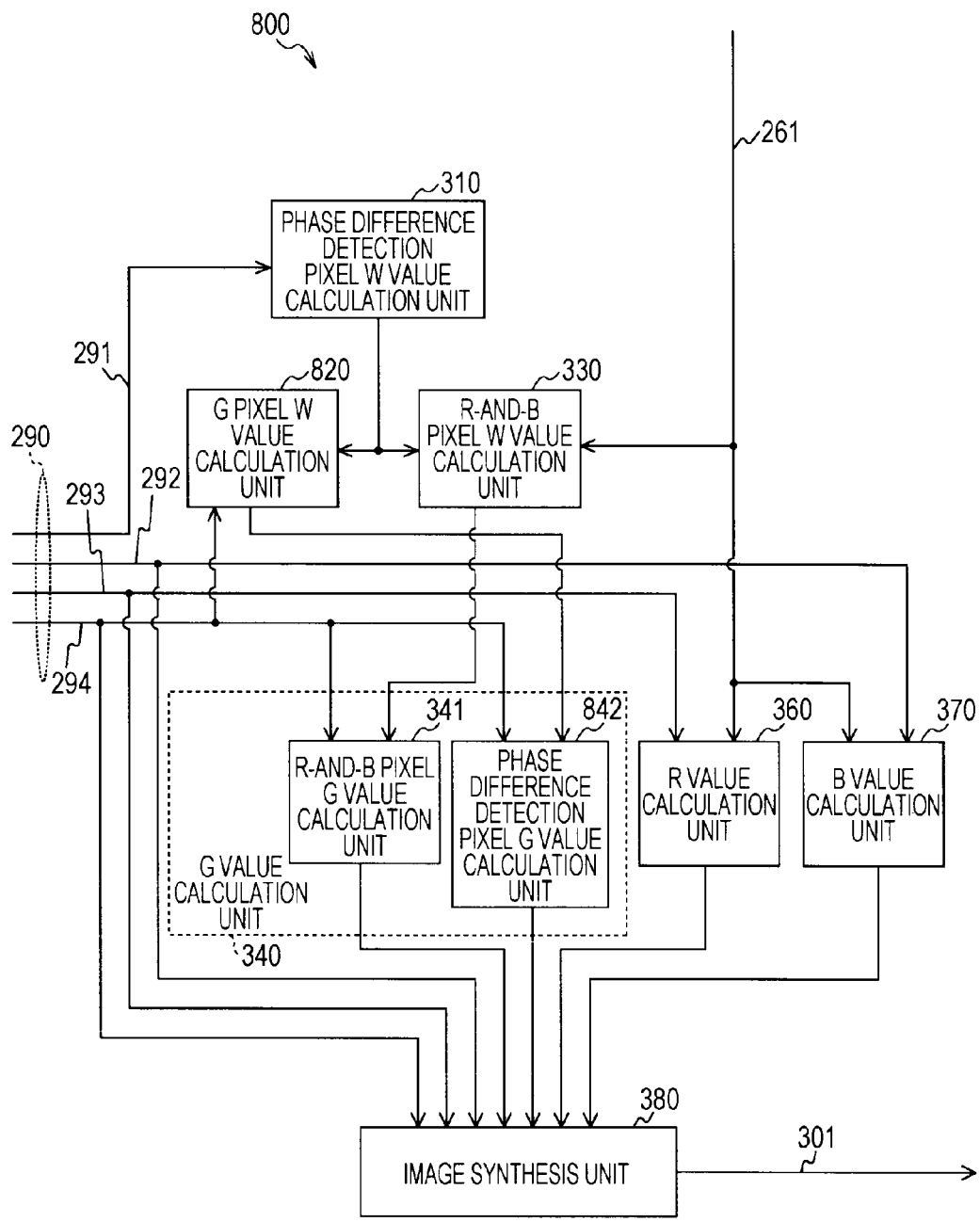
FIG. 18 is a block diagram showing an example of a functional configuration of a demosaicing unit according to a second embodiment of the present disclosure.

FIG. 18 is a block diagram showing an example of a functional configuration of a demosaicing unit 800 according to a second embodiment of the present disclosure.

The configuration of the imaging apparatus according to the second embodiment of the present disclosure is equal to that of the imaging apparatus 100 except that the demosaicing unit 800 is mounted instead of the demosaicing unit 300 of the imaging apparatus 100 according to the first embodiment of the present disclosure shown in FIG. 2. The description of the configuration of the imaging apparatus according to the second embodiment of the present disclosure will now be omitted.

The demosaicing unit 800 includes a phase difference detection pixel W value calculation unit 310, a G pixel W value calculation unit 820, an R-and-B pixel W value calculation unit 330, an R-and-B pixel G value calculation unit 341 and a phase difference detection pixel G value calculation unit 842. The demosaicing unit 300 includes the R value calculation unit 360, the B value calculation unit 370 and the image synthesis unit 380. The configuration of the demosaicing unit 800 is equal to that of the demosaicing unit 300 except that the phase difference detection pixel G value calculation unit 842 is included instead of the phase difference detection pixel G value 342 of the demosaicing unit 300 shown in FIG. 3 and the G pixel W value calculation unit 820 is newly included. Therefore, only the G pixel W value calculation unit 820 and the phase difference detection pixel G value calculation unit 842 will be described.

The G pixel W value calculation unit 820 calculates the W value of the G pixel (G pixel W value) based on the phase difference detection pixel W value supplied from the phase difference detection pixel W value calculation unit 310 and the G value of the G pixel (G pixel G value) supplied through the G line 294 of the signal line 290. The G pixel W value calculation unit 820 supplies the calculated G pixel W value to the phase difference detection pixel G value calculation unit 842. Calculation of the G pixel W value by the G pixel W value calculation unit 820 will be described with reference to FIGS. 19A and 19B.

The phase difference detection pixel G value calculation unit 842 calculates the phase difference detection pixel G value based on the G value of the G pixel (G pixel G value) supplied through the G line 294 of the signal line 290 and the G pixel W value supplied from the G pixel W value calculation unit 820. The phase difference detection pixel G value calculation unit 842 calculates the phase difference detection pixel G value based on correlation between the W value and the G value. The phase difference detection pixel G value calculation unit 842 supplies the calculated phase difference detection pixel G value to the image synthesis unit 380.

Example of the Calculation of W Value of G Pixel by G Pixel W Value Calculation Unit 820

FIGS. 19A and 19B are schematic diagrams showing an example of the calculation of a W value of a G pixel by the G pixel W value calculation unit 820 according to the second embodiment of the present disclosure.

FIG. 19A schematically shows 9 pixels in a column in which the B pixel, the Gr pixel (in the same figure, referred to as a G pixel) and the phase difference detection pixel are arranged. FIG. 19A shows 9 pixels adjacent to the G pixel (G pixel 550), the W value of which is to be calculated, in the column direction. The 9 pixels (the G pixels 510, 550 and 590, the B pixels 530 and 570 and the phase difference detection pixels 520, 540, 560 and 580) are pixels which hold the pixel values used when calculating the W value of the G pixel 550.

FIG. 19B shows an example of the calculation of the W value of the G pixel by the G pixel W value calculation unit 820 along with the pixel values of the 9 pixels shown in FIG. 19A.

As shown in the inside of the 9 pixels arranged in one column of FIG. 19B, when the G pixel W value calculation unit 820 calculates the W value, the pixel value of the G pixel is configured by the G value and the pixel value of the B pixel is configured by the B value. The pixel value of the phase difference detection pixel is configured by the W value calculated by the phase difference detection pixel W value calculation unit 310. In FIG. 19B, the G values of the G pixels (G pixels 510, 550 and 580) are denoted by G values 511, 551 and 591 and the B values of the B pixels (B pixels 530 and 550) are denoted by the B values 533 and 573. The W values of the phase difference detection pixels (phase difference detection pixels 520, 540, 560 and 580) are denoted by the W values 524, 544, 564 and 584.

Now, calculation of the W value of the G pixel 550 by the G pixel W value calculation unit 820 will be described. In calculation of the W value of the G pixel 550, the G pixel W value calculation unit 820 calculates the W value based on correlation between the G value and the W value and the G value of the G pixel 550.

The W value ($W_{G550}$) of the G pixel 550 is calculated, for example, using Equations 17 to 19.

$$W_{G550} = (W_m/G_m) \times G_{G550} \quad (17)$$

$$W_m = a \times W_{W520} + b \times W_{W540} + c \times W_{W560} + d \times W_{W580} \quad (18)$$

$$G_m = e \times G_{G510} + f \times G_{G550} + g \times G_{G590} \quad (19)$$

where, $G_{G550}$ is the G value of the G pixel 550. In addition, $G_{G510}$ is the G value of the G pixel 510 and $G_{G590}$ is the G value of the G pixel 590. In addition, $W_{W520}$ is the W value of the phase difference detection pixel (referred to as the W pixel) 520, $W_{W540}$ is the W value of W pixel 540, $W_{W560}$ is the W value of the W pixel 560, $W_{W580}$ is the W value of the W pixel 580.

In addition, a to g are weight coefficients and are equal to those described with reference to FIGS. 8A and 8B and thus description thereof will be omitted.

In addition, $W_m$ is a low frequency component of the W value calculated by applying a low pass filter using the position of the G pixel 550 as a reference and, similarly, $G_m$ is a low frequency component of the G value calculated by applying a low pass filter using the position of the G pixel 550 as a reference.

That is, Equations 17 to 19 are equations for calculating the W value using correlation between the low frequency component of the G value and the low frequency component of the W value, similarly to Equations 9 to 11 shown in FIGS. 8A and 8B. As shown in Equation 17, the W value of the G pixel 550 is calculated based on correlation in low frequency component between the G value and the W value and the G value of the G pixel 550.

In FIG. 19B, the W value ($W_{G550}$) of the G pixel 550 corresponds to the W value 554 (region in which a point is marked) shown in the G pixel 550 shown on the right of an arrow. The pixel values used when calculating the W value ($W_{G550}$) correspond to the pixel values (the G values 511, 551 and 591 and the W values 524, 544, 564 and 584) surrounded by a thick line of the 9 pixels arranged in one column.

In the G pixel W value calculation unit 820, the G pixel W value is calculated based on correlation in low frequency component between the G value and the W value and the G value of the G pixel 550.

The phase difference detection pixel G value calculation unit 842 calculates the phase difference detection pixel G value based on correlation in low frequency component between the G value and the W value and the W value of the phase difference detection pixel, as shown in FIGS. 19A and 19B. In the phase difference detection pixel G value calculation unit 842, a low pass filter corresponding to the arrangement of pixels adjacent to the phase difference detection pixel to be calculated in the column direction is used.

Example of Operation of Imaging Apparatus

Next, the operation of the demosaicing unit 800 according to the second embodiment of the present disclosure will be described with reference to the figures.

Figure 20:
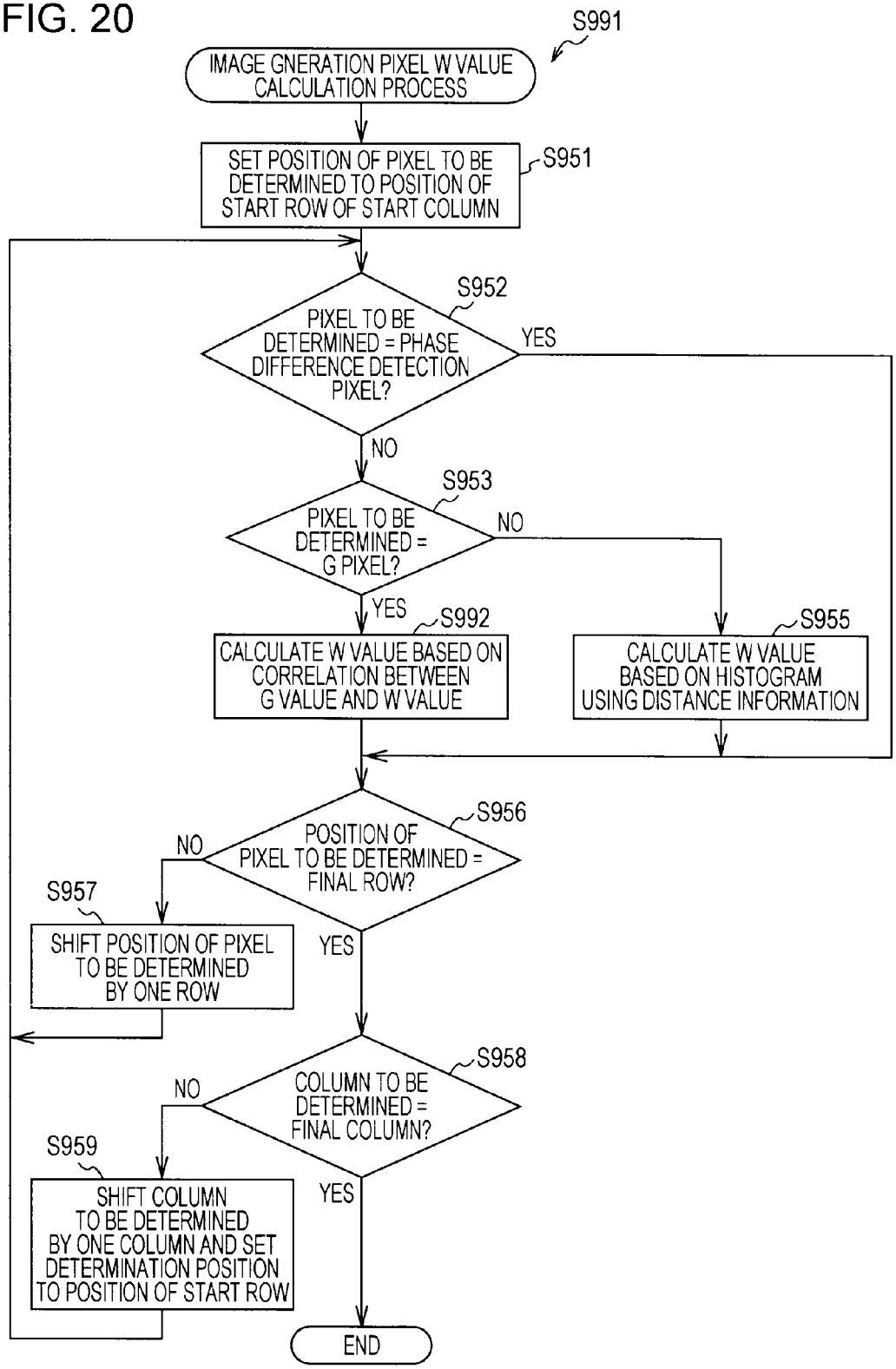
FIG. 20 is a flowchart illustrating a processing procedure of an image generation pixel W an example of value calculation process (step S991) by a G pixel W value calculation unit and an R-and-B pixel W value calculation unit according to the second embodiment of the present disclosure.

FIG. 20 is a flowchart illustrating a processing procedure of an image generation pixel W value calculation process (step S991) by the G pixel W value calculation unit 820 and the R-and-B pixel W value calculation unit 330 according to the second embodiment of the present disclosure.

This processing procedure is a modified example of FIG. 14 and is different therefrom in that the W value of the G pixel is calculated by the G pixel W value calculation unit 820. Since the other portions are equal to those of FIG. 14, the common parts with FIG. 14 are denoted by the same reference numerals and description thereof will be partially omitted.

If it is determined that the pixel to be determined is the G pixel (step S953), by the G pixel W value calculation unit 820, the W value of the G pixel is calculated using correlation between the W value and the G value (step S992) and then the process progresses to step S956.

Figure 21:
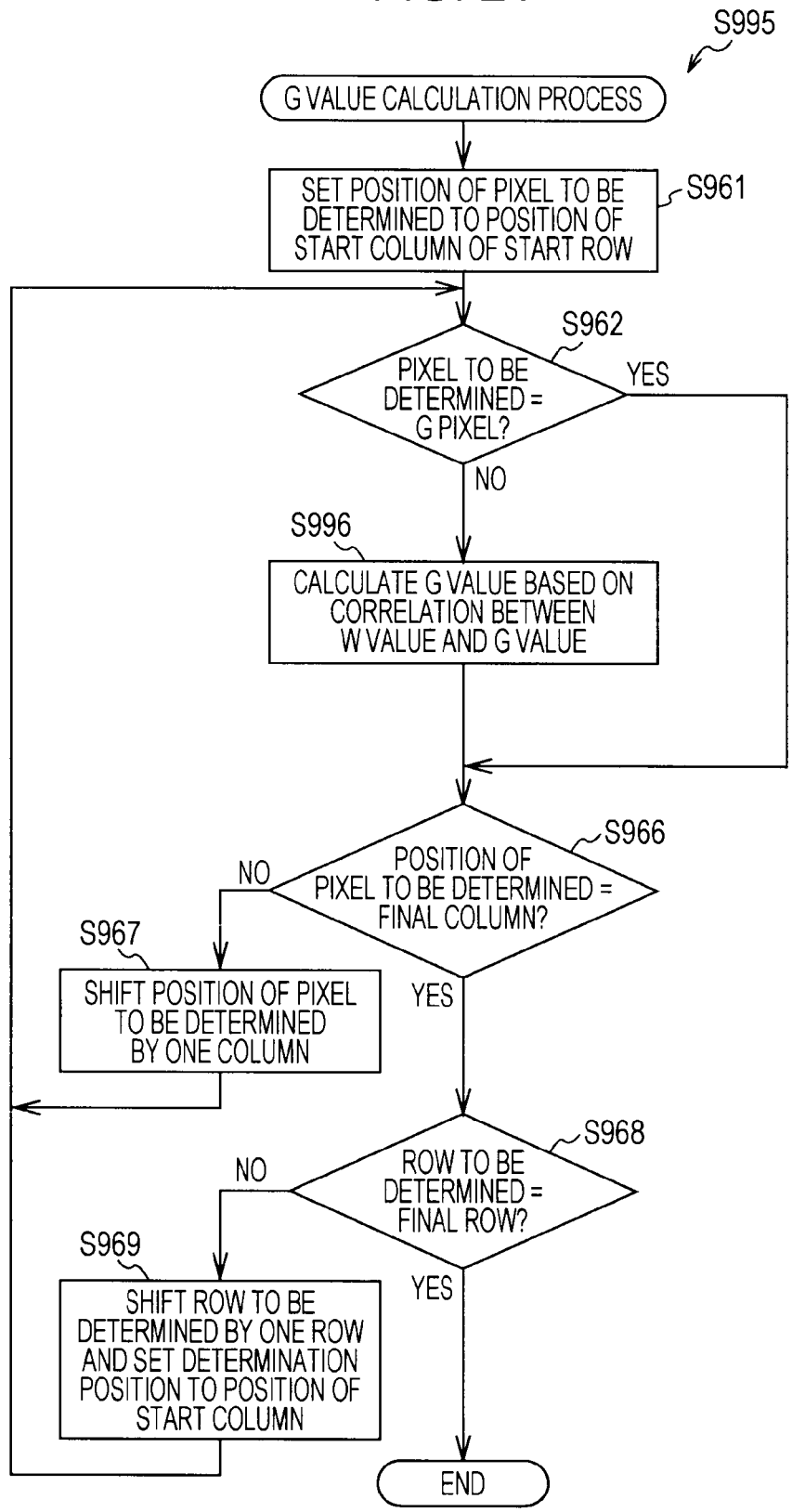
FIG. 21 is a flowchart illustrating an example of a processing procedure of a G value calculation process (step S995) by an R-and-B pixel G value calculation unit and a phase difference detection pixel G value calculation unit according to the second embodiment of the present disclosure.

FIG. 21 is a flowchart illustrating a processing procedure of a G value calculation process (step S995) by the R-and-B pixel G value calculation unit 341 and the phase difference detection pixel G value calculation unit 842 according to the second embodiment of the present disclosure. This processing procedure is a modified example of FIG. 15 and is different therefrom in that the G value of the phase difference detection pixel is calculated by the phase difference detection pixel G value calculation unit 842.

Since the other portions are equal to those of FIG. 15, the common parts with FIG. 15 are denoted by the same reference numerals and description thereof will be partially omitted.

If it is determined that the pixel to be determined is not the G pixel (step S962), the G value is calculated using correlation between the W value and the G value (step S992) and then the process progresses to step S966. The G value of the R pixel or the B pixel is calculated, for example, using Equations 9 to 14 shown in FIGS. 8A and 8B. The G value of the phase difference detection pixel is calculated, for example, using the G value and the W value of the image generation pixel adjacent to the phase difference detection pixel, the G value of which is to be calculated, in the column direction, similarly to Equations 17 to 19 of FIG. 19.

According to the second embodiment of the present disclosure, it is possible to improve image quality of image data, similarly to the first embodiment of the present disclosure, even when the G pixel W value is calculated based on correlation in low frequency component between the G value and the W value and the G value of the G pixel 550.

3. Modified Example

In the first and second embodiments of the present disclosure, it is assumed that, in the arrangement of pixels of the imaging device, as shown in FIG. 4, the row in which the image generation pixels are arranged and the row in which the phase difference detection pixels are arranged are alternately arranged. However, the present disclosure is not limited thereto and is applicable to the case of using the imaging device having other pixel arrangements, similarly to the first and second embodiments of the present disclosure. The present disclosure is even applicable to the case where a color filter pixel is included in the phase difference detection pixel, similarly to the first and second embodiments of the present disclosure.

Figure 22:
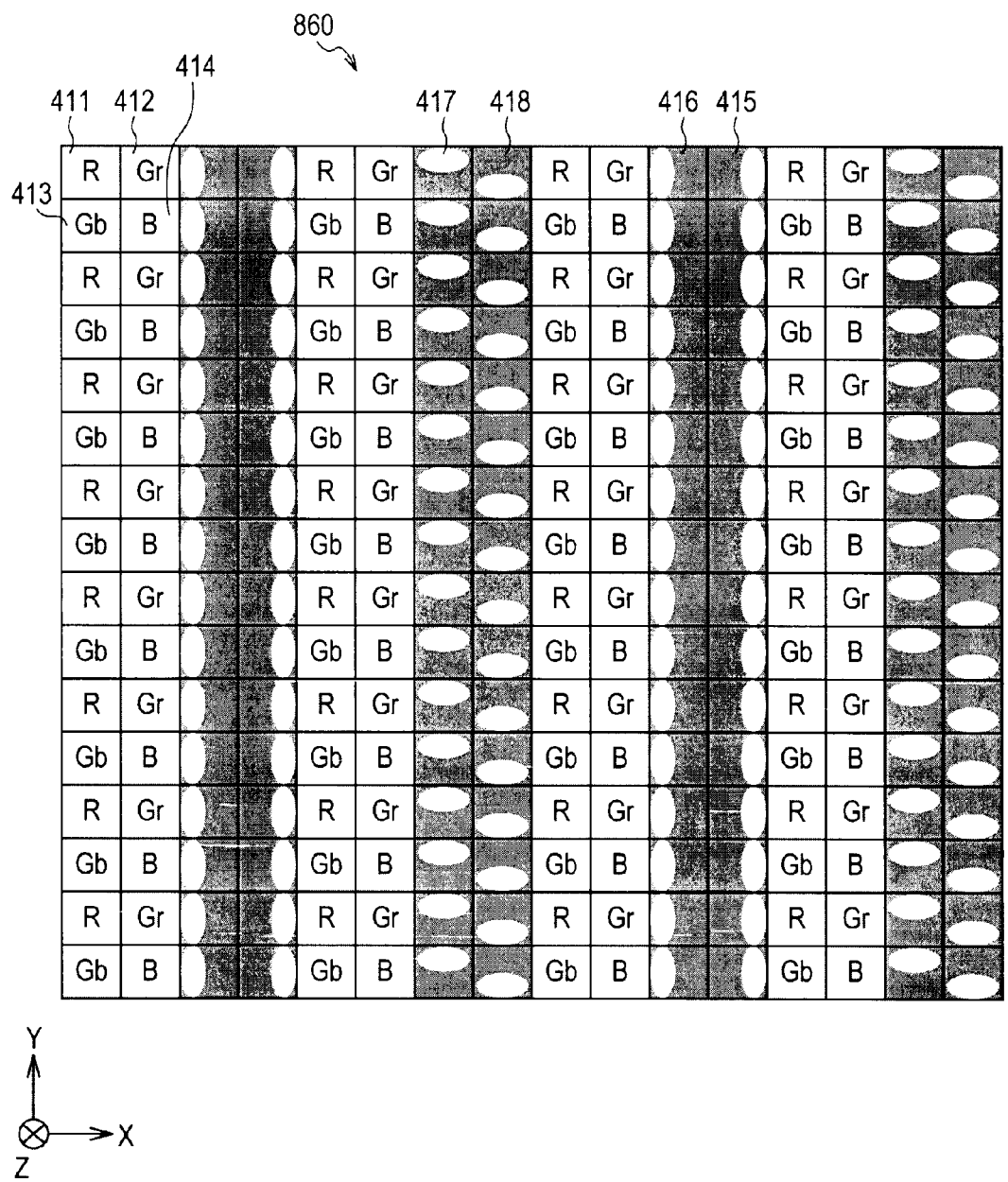
FIG. 22 is a schematic diagram showing an example of arrangement of pixels of an imaging device in which image generation pixels arranged in two columns and phase difference detection pixels arranged in two columns are alternately arranged as a modified example of the first embodiment of the present disclosure.
Figure 23:
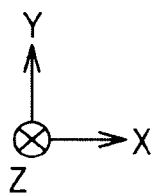
FIG. 23 is a schematic diagram showing an example of arrangement of pixels of an imaging device in which phase difference detection pixels each including a G filter are arranged as a modified example of the first embodiment of the present disclosure.

In FIG. 22, an example of an imaging device in which image generation pixels arranged in two columns and phase difference detection pixels arranged in two columns are alternately arranged will be described. In FIG. 23, an example of an imaging device in which phase difference detection pixels each including a color filter (G filter) transmitting green (G) light will be described.

Example of Arrangement of Pixels in Imaging Device

FIG. 22 is a schematic diagram showing an example of arrangement of pixels of an imaging device in which image generation pixels arranged in two columns and phase difference detection pixels arranged in two columns are alternately arranged as a modified example of the first embodiment of the present disclosure.

FIG. 22 corresponds to FIG. 4 showing arrangement of pixels of the imaging device 210 according to the first embodiment of the present disclosure. That is, FIG. 22 shows a region (region 860) of some pixels (16×16 pixels) among pixels configuring the imaging device according to a third embodiment of the present disclosure. As shown in the region 860, in the modified example of the first embodiment of the present disclosure, two columns in which the image generation pixels are arranged and the two columns in which the phase difference detection pixels are arranged are alternately arranged. That is, as shown in FIG. 22, in the x-axis direction, the image generation pixel, the image generation pixel, the phase difference detection pixel, the phase difference detection pixel, the image generation pixel, the image generation pixel, the phase difference detection pixel, the phase difference detection pixel, . . . are alternately arranged.

In such pixel arrangement, the R-and-B pixel G value calculation unit 341 calculates the G value using the W value and the G value of the pixel adjacent to the pixel, the G value of which is to be calculated, in the column direction (for example, calculation shown in FIG. 19). Thus, it is possible to perform the demosaicing process, similarly to the first embodiment of the present disclosure.

FIG. 23 is a schematic diagram showing an example of arrangement of pixels of an imaging device in which phase difference detection pixels each including a G filter are arranged as a modified example of the first embodiment of the present disclosure.

FIG. 23 corresponds to FIG. 4 showing arrangement of pixels of the imaging device 210 according to the first embodiment of the present disclosure, similarly to FIG. 22.

In a region 870 shown in FIG. 23, phase difference detection pixels (phase difference detection pixels 875 to 878) each including the G filter is shown.

In such pixel arrangement, the G value of the phase difference detection pixel is calculated by calculating the pixel value corresponding to the light shielding region and summing the calculated pixel value and the pixel value of the phase difference detection pixel, similarly to Equations 1 to 8 shown in FIGS. 6A to 6F. Since the G value is calculated instead of the W value, division of "2" of Equations 2, 4, 6 and 8 becomes unnecessary.

The G values of the R pixel and the B pixel are calculated from the histogram based on the distance information. The R value and the B value are calculated from the histogram based on the distance information, similarly to the first embodiment of the present disclosure. Accordingly, it is possible to perform the demosaicing process, similarly to the first embodiment of the present disclosure.

In the embodiments of the present disclosure, by performing the demosaicing process using the pixel value of the phase difference detection pixel, it is possible to improve image quality of image data. That is, in the embodiments of the present disclosure, by calculating the W value from the pixel value of the phase difference detection pixel and performing the demosaicing process using the W value, it is possible to increase the number of pixel values which may be referred to upon the demosaicing process and improve resolution or improve interpolation precision. By calculating the distance information from the pixel value of the phase difference detection pixel and performing the demosaicing process using the distance information so as to perform interpolation while identifying objects having the same color and having different distances, it is possible to improve interpolation precision.

In general, the image generation pixel (W pixel) including the W filter is apt to be saturated. Accordingly, the imaging apparatus including the W pixel includes an exposure control circuit for the W pixel. In the embodiments of the present disclosure, by estimating the W value from the pixel value of the phase difference detection pixel in which a portion of the pupil divided light is shielded, saturation hardly occurs even when the exposure control circuit is not included (up to twice a saturated amount of a light receiving surface of a light receiving element may be accumulated). By estimating the W value from the pixel value of the phase difference detection pixel and using the W value in the demosaicing process, it is possible to improve a signal/noise ratio (S/N) ratio.

Although the case where the color filters included in the image generation pixels are color filters having three primary colors (RGB) is described, the present disclosure is not limited thereto. For example, the present disclosure is equally applicable to the case where color filters having complementary colors are included in the image generation pixels.

Although the case where the phase difference detection pixel receives portions of light pupil divided into two is described, the present disclosure is not limited thereto. For example, the embodiments of the present disclosure is applicable to the case where two light receiving elements are included and the phase difference detection pixels capable of receiving the pupil divided light by the light receiving elements, thereby improving the image quality of image data.

Although the imaging apparatus is described as an example in the embodiments of the present disclosure, the present disclosure is not limited thereto. For example, the process according to the first embodiment of the present disclosure may be performed by an external apparatus (for example, a personal computer) of the imaging apparatus based on recorded RWA data.

The embodiments of the present disclosure are examples for embodying the present disclosure. As described in the embodiments of the present disclosure, the matter of the embodiments of the present disclosure corresponds to the specific matter of the claims. Similarly, the specific matter of the claims corresponds to the matter of the embodiments of the present disclosure having the same names. The present disclosure is not limited to the embodiments and various modifications of the embodiments may be implemented without departing from the scope of the present disclosure.

The processing procedures described in the embodiments of the present disclosure may be a method having a series of procedures, a program for executing the series of procedures or a recording medium for storing the program. As the recording medium, for example, a compact disc (CD), a mini disc (MD), a digital versatile disc (DVD), a memory card, a Blu-ray Disc (registered trademark), or the like may be used.

The present disclosure contains subject matter related to that disclosed in Japanese Priority Patent Application JP 2010-282524 filed in the Japan Patent Office on Dec. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an estimation unit configured to estimate an image generation pixel value corresponding to a position of a phase difference detection pixel of an image data, based on a determination pixel value of the image data, wherein the image data comprises the phase difference detection pixel and an image generation pixel, wherein the phase difference detection pixel generates the determination pixel value for making a focus determination and the image generation pixel generates the image generation pixel value for generating an image; and
an interpolation unit configured to interpolate image generation pixel values of pixels configuring the image data based on the estimated image generation pixel value and the generated image generation pixel value.

2. The image processing apparatus according to claim 1, further comprising a distance information generation unit configured to generate distance information based on a defocus quantity calculated based on the determination pixel value for each phase difference detection pixel,
wherein the interpolation unit interpolates the image generation pixel values of pixels configuring the image data based on the estimated image generation pixel value, the distance information and the image generation pixel value generated by the image generation pixel.

3. The image processing apparatus according to claim 2, wherein the interpolation unit sets a color to be an interpolation of a reference pixel as a target color using a pixel to be interpolated as the reference pixel, calculates the distance information of the image generation pixel based on distance information of the phase difference detection pixel if the image generation pixel value of the reference pixel is interpolated using the distance information, sets a pixel which holds an image generation pixel value related to the target color among pixels located in a predetermined range from the reference pixel as a target pixel, detects the target pixel within the predetermined range from the reference pixel in a distance specified by the distance information of the target pixel based on the distance information, and interpolates the image generation pixel values by setting an average value of the image generation pixel value related to the target color of the detected target pixel to the image generation pixel value related to the target color of the pixel to be interpolated.

4. The image processing apparatus according to claim 3, wherein the interpolation unit creates a frequency distribution of pixels for the distance specified by the distance information of the target pixel, sets a distance, in which a frequency of the frequency distribution belongs to a maximum class, as a reference, detects the target pixel corresponding to the distance within the predetermined range from the reference, and sets the average value of the image generation pixel value related to the target color of the detected target pixel as the image generation pixel value related to the target color of the pixel to be interpolated.

5. The image processing apparatus according to claim 1, wherein the phase difference detection pixel comprises
a microlens, a light receiving element and a light shielding unit disposed between the microlens and the light receiving element, wherein the microlens is configured to focus subject light, the light receiving element is configured to generate an image generation pixel value by receiving the subject light and the light shielding unit is configured to partially shield the subject light, and
the estimation unit calculates the pixel value related to the partially shielded light based on the determination pixel value generated by the phase difference detection pixel to be estimated and the determination pixel value generated by the phase difference detection pixel adjacent to the phase difference detection pixel to be estimated, and estimates the image generation pixel value of the position of the phase difference detection pixel based on the calculated pixel value and the determination pixel value of the phase difference detection pixel to be estimated.

6. The image processing apparatus according to claim 5, wherein the image generation pixel includes a red pixel covered by a red filter for shielding light other than a wavelength region indicating red, a blue pixel covered by a blue filter for shielding light other than a wavelength region indicating blue, and a green pixel covered by a green filter for shielding light other than a wavelength region indicating green,
the phase difference detection pixel is covered by a white filter or a transparent layer transmitting light of a visible light region, and the estimation unit estimates the image generation pixel value related to white as the image generation pixel value of the position of the phase difference detection pixel.

7. The image processing apparatus according to claim 6, wherein the interpolation unit sets a color to be an interpolation of a reference pixel to a target color using a pixel to be interpolated as the reference pixel, interpolates the image generation pixel value related to white of the image generation pixel values of pixels configuring the image data, and interpolates the image generation pixel values related to the target color of the reference pixel, based on the image generation pixel value related to the target color of the pixels located within a predetermined range from the reference pixel, the image generation pixel value related to white of the pixels covered by the same filter as the pixel to be interpolated as the pixels located within the predetermined range from the reference pixel and the image generation pixel value related to the white of the reference pixel.

8. The image processing apparatus according to claim 7, wherein the interpolation unit interpolates the image generation pixel values related to the target color of the reference pixel, based on a low frequency component of the image generation pixel value related to the white calculated based on the image generation pixel value related to the white of the pixels located within the predetermined range from the reference pixel, a low frequency component of the image generation pixel value related to the target color calculated based on the image generation pixel value related to the target color of the pixels covered by the filter of the target color located within the predetermined range from the reference pixel, and the image generation pixel value related to the white of the reference pixel.

9. The image processing apparatus according to claim 7, wherein, in the imaging device, a first line configured by arranging the image generation pixels in a specific direction and a second line configured by arranging the phase difference detection pixels in the specific direction are alternately arranged in an orthogonal direction orthogonal to the specific direction, and
the interpolation unit interpolates the image generation pixel values related to the white of the green pixel, based on a low frequency component of the image generation pixel value related to the white calculated from the image generation pixel value related to the white of the phase difference detection pixels located within the predetermined range in the orthogonal direction of the reference pixel and a low frequency component of the image generation pixel value related to the white calculated from the image generation pixel value related to green of the green pixels located within the predetermined range, and the image generation pixel value related to green of the reference pixel.

10. An image processing apparatus comprising:
a distance information generation unit configured to generate distance information based on a defocus quantity calculated for each phase difference detection pixel based on a determination pixel value of image data, wherein the image data comprises a phase difference detection pixel and an image generation pixel, wherein the phase difference detection pixel generates the determination pixel value for making a focus determination and the image generation pixel generates the image generation pixel value for generating an image; and
an interpolation unit configured to interpolate the image generation pixel value of a pixel to be interpolated among pixels configuring the image data based on the generated distance information and the generated image generation pixel value.

11. An image processing method comprising:
estimating an image generation pixel value corresponding to a position of a phase difference detection pixel of an image data, based on a determination pixel value of the image data, wherein the image data comprises the phase difference detection pixel and an image generation pixel, wherein the phase difference detection pixel generates the determination pixel value for making a focus determination and the image generation pixel generates the image generation pixel value for generating an image; and
interpolating image generation pixel values of pixels configuring the image data based on the estimated image generation pixel value and the generated image generation pixel value.

12. The image processing method according to claim 11, comprising correcting the image data based on a predetermined signal processing technique.

13. The image processing method according to claim 12, wherein the predetermined signal processing technique comprises one or more of: a black level correction, a defect correction, a shading correction, and/or a mixed color correction.

14. The image processing method according to claim 11, comprising detecting deviation of focus of a pair of phase difference detection pixels.

15. The image processing method according to claim 14, comprising demosaicing based on the image data generated by the phase difference detection pixel, the image data generated by the image generation pixels, and the detected deviation of focus.

16. The image processing method according to claim 11, comprising correcting color balance of the image data based on a predetermined reference color.

17. The image processing method according to claim 16, comprising performing a non-linear conversion on the corrected image data.

18. A non-transitory computer-readable storage medium having stored thereon, a computer program having at least one code section for image processing, the at least one code section being executable by a computer for causing the computer to perform steps comprising:
estimating an image generation pixel value corresponding to a position of a phase difference detection pixel of an image data, based on a determination pixel value of the-image data, wherein the image data comprises the phase difference detection pixel and an image generation pixel, wherein the phase difference detection pixel generates the determination pixel value for making a focus determination and the image generation pixel generates the image generation pixel value for generating an image; and
interpolating image generation pixel values of pixels configuring the image data based on the estimated image generation pixel value and the generated image generation pixel value.

19. The non-transitory computer-readable storage medium according to claim 18, comprising correcting color balance of the image data based on a predetermined reference color.

20. The non-transitory computer-readable storage medium according to claim 19, comprising performing a non-linear conversion on the corrected color balance of the image data.

* * * * *